(12) United States Patent
Lee et al.

(10) Patent No.: US 10,608,306 B2
(45) Date of Patent: Mar. 31, 2020

(54) METAL AIR BATTERY SYSTEM AND METHOD OF OPERATING THE SAME

(71) Applicant: Samsung Electronics Co., Ltd., Suwon-si, Gyeonggi-do (KR)

(72) Inventors: Heungchan Lee, Seongnam-si (KR); Eunha Park, Suwon-si (KR); Dongjoon Lee, Suwon-si (KR); Dongmin Im, Seoul (KR); Jeongsik Ko, Seongnam-si (KR); Hyukjae Kwon, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 263 days.

(21) Appl. No.: 15/196,274

(22) Filed: Jun. 29, 2016

(65) Prior Publication Data

US 2017/0012332 A1    Jan. 12, 2017

(30) Foreign Application Priority Data

Jul. 8, 2015    (KR) .......................... 10-2015-0097158

(51) Int. Cl.
*H01M 8/22* (2006.01)
*H01M 12/02* (2006.01)
(Continued)

(52) U.S. Cl.
CPC ........... *H01M 12/02* (2013.01); *H01M 4/382* (2013.01); *H01M 8/04089* (2013.01);
(Continued)

(58) Field of Classification Search
CPC ...... H01M 12/02; H01M 12/04; H01M 12/06; H01M 12/065; H01M 12/08; H01M 4/382;
(Continued)

(56) References Cited

U.S. PATENT DOCUMENTS 6,835,479 B2    12/2004  Balliet et al.
7,282,295 B2    10/2007  Visco et al.
(Continued)

FOREIGN PATENT DOCUMENTS

EP    2144325 A1    1/2010
JP    2002516474 A   6/2002
(Continued)

OTHER PUBLICATIONS

European Search Report for European Patent Application No. 1617825836 dated Oct. 5, 2016.
(Continued)

*Primary Examiner* — Raymond Alejandro
(74) *Attorney, Agent, or Firm* — Cantor Colburn LLP

(57) ABSTRACT

A metal air battery system includes an oxygen supplying unit configured to discharge oxygen; a metal air battery module configured to receive the oxygen from the oxygen supplying unit and perform a discharge reaction; and an auxiliary power source configured to charge the metal air battery module during an operational stop of the metal air battery module so that at least some of a discharge product is discharged from the metal air battery module.

32 Claims, 8 Drawing Sheets

(51) Int. Cl.
*H01M 8/04082* (2016.01)
*H01M 8/0662* (2016.01)
*H01M 12/08* (2006.01)
*H01M 8/04089* (2016.01)
*H01M 8/04223* (2016.01)
*H01M 4/38* (2006.01)
*H01M 12/06* (2006.01)

(52) U.S. Cl.
CPC ... *H01M 8/04201* (2013.01); *H01M 8/04231* (2013.01); *H01M 8/0662* (2013.01); *H01M 12/06* (2013.01); *H01M 12/08* (2013.01); *Y02E 60/128* (2013.01)

(58) Field of Classification Search
CPC ......... H01M 8/04089; H01M 8/04201; H01M 8/04231; H01M 8/0662; Y02E 60/128
See application file for complete search history.

(56) References Cited

U.S. PATENT DOCUMENTS

| | | |
|---|---|---|
| 7,691,536 B2 | 4/2010 | Johnson |
| 7,767,345 B2 | 8/2010 | Imagawa et al. |
| 8,803,470 B2 | 8/2014 | Stewart et al. |
| 8,871,395 B2 | 10/2014 | Nakanishi |
| 9,166,263 B2 | 10/2015 | Ma et al. |
| 9,178,254 B2 | 11/2015 | Lee et al. |
| 9,263,779 B2 | 2/2016 | Lee et al. |
| 9,680,191 B2 | 6/2017 | Lee et al. |
| 9,780,386 B2 | 10/2017 | Kwon et al. |
| 9,911,957 B2 | 3/2018 | Choi et al. |
| 9,947,933 B2 | 4/2018 | Roev et al. |
| 10,008,753 B2 | 6/2018 | Kwon et al. |
| 2007/0231704 A1 | 10/2007 | Inda |
| 2008/0070087 A1 | 3/2008 | Johnson |
| 2011/0059355 A1 | 3/2011 | Zhang et al. |
| 2011/0129739 A1 | 6/2011 | Nakanishi |
| 2011/0223494 A1 | 9/2011 | Feaver et al. |
| 2012/0012783 A1 | 1/2012 | Scotto |
| 2012/0040253 A1* | 2/2012 | Hermann .......... H01M 8/04089 429/403 |
| 2012/0077084 A1 | 3/2012 | Christensen et al. |
| 2012/0077095 A1 | 3/2012 | Roumi et al. |
| 2012/0115048 A1 | 5/2012 | Roev et al. |
| 2012/0276459 A1 | 11/2012 | Im et al. |
| 2013/0224609 A1 | 8/2013 | Lee et al. |
| 2014/0045080 A1* | 2/2014 | Albertus ............... H01M 12/08 429/405 |
| 2014/0127596 A1 | 5/2014 | Sun et al. |
| 2015/0024291 A1 | 1/2015 | Ito et al. |
| 2015/0037692 A1 | 2/2015 | Park et al. |
| 2016/0322685 A1 | 11/2016 | Choi |

FOREIGN PATENT DOCUMENTS

| | | |
|---|---|---|
| JP | 2004220942 A | 8/2004 |
| JP | 2011129389 A | 6/2011 |
| JP | 2013109959 A | 6/2013 |
| JP | 2014026811 A | 2/2014 |
| KR | 1020090127325 A | 12/2009 |
| KR | 1020120047602 A | 5/2012 |
| KR | 1020120063163 A | 6/2012 |
| KR | 1020120122674 A | 11/2012 |
| KR | 1020130001170 A | 1/2013 |
| KR | 1020130046247 A | 5/2013 |
| KR | 1020130099706 A | 9/2013 |
| KR | 1020130112314 A | 10/2013 |
| KR | 1020140006639 A | 1/2014 |
| KR | 1020140105100 A | 9/2014 |
| KR | 1020150016730 A | 2/2015 |
| KR | 1020150031377 A | 3/2015 |
| KR | 1020160018337 A | 2/2016 |
| KR | 1020160128164 A | 11/2016 |
| KR | 1020170007110 A | 1/2017 |
| WO | 2016/100900 A1 | 6/2016 |

OTHER PUBLICATIONS

Harding et al., "Instability of Poly(ethylene oxide) upon Oxidation in Lithium-Air Batteries", The Journal of Physical Chemistry, vol. 119, 2015, pp. 6947-6955.

X. J. Chen et al., "A High-Rate Rechargeable Li-Air Flow Battery," Journal of the Electrochemical Society, Jul. 25, 2013, pp. A1619-A1623, vol. 160, Issue 10.

Kigui Zhang et al., "A Simple Method of Making a Li-air Battery with Longevity," International Journal of Electrochemical Science, Nov. 1, 2012, pp. 10562-10569, vol. 7.

Yuyan Shao et al., "Making Li-Air Batteries Rechargeable: Material Challenges," Advanced Functional Materials, 2013, pp. 987-1004, vol. 23.

* cited by examiner

METAL AIR BATTERY SYSTEM AND METHOD OF OPERATING THE SAME

CROSS-REFERENCE TO RELATED APPLICATION

This application claims priority to and the benefit of Korean Patent Application No. 10-2015-0097158, filed on Jul. 8, 2015, in the Korean Intellectual Property Office, the content of which is incorporated herein in its entirety by reference.

BACKGROUND

1. Field

The present disclosure relates to a metal air battery system and a method of operation the metal air battery.

2. Description of the Related Art

A metal air battery includes an anode capable of including and discharging ions and a cathode using oxygen from the air as an active material. In the metal air battery, a reduction-oxidation reaction of the oxygen occurs at the cathode and an oxidation-reduction reaction of metal occurs at the anode. Chemical energy generated during the reaction is converted into electrical energy. For example, a metal air battery absorbs oxygen during a discharge operation and discharges oxygen during a charging operation. As such, since the metal air battery uses oxygen from the air, an energy density of the metal air battery may be remarkably improved. Nonetheless, there remains a need for an improved metal air battery system, and a method of operating the metal air battery.

SUMMARY

Provided is a metal air battery system and a method of operation the metal air battery system.

Additional aspects will be set forth in part in the description which follows and, in part, will be apparent from the description, or may be learned by practice of the presented exemplary embodiments.

According to an aspect of an exemplary embodiment, a metal air battery system includes an oxygen supplying unit configured to separate and discharge oxygen, a metal air battery module configured to receive the oxygen from the oxygen supplying unit and perform a discharge reaction, and an auxiliary power source configured to charge the metal air battery module during an operational stop of the metal air battery module so that at least some of a discharge product is discharged from the metal air battery module.

The oxygen supplying unit may include a purifier configured to purify the externally supplied air and a separator configured to separate air purified by the purifier into oxygen and nitrogen.

The auxiliary power source may be further configured to drive the oxygen supplying unit during the operational stop of the metal air battery module to supply nitrogen separated and discharged by the separator of the oxygen supplying unit to inside the metal air battery module so as to remove at least some oxygen from the metal air battery module.

The auxiliary power source may be further configured to drive the oxygen supplying unit during the operational stop of the metal air battery module to supply air purified by the purifier of the oxygen supplying unit to inside the metal air battery module so as to remove at least oxygen from the metal air battery module.

The metal air battery system may further include another auxiliary power source configured to drive the oxygen supplying unit during the operational stop of the metal air battery module.

The metal air battery system may further include a nitrogen reservoir configured to store nitrogen separated and discharged by the oxygen supplying unit and supply nitrogen inside the metal air battery module during the operational stop of the metal air battery module so as to remove at least some of the oxygen from the metal air battery module.

The auxiliary power source may be further configured to drive the oxygen supplying unit during the operational stop of the metal air battery module to supply nitrogen separated and discharged by the separator of the oxygen supplying unit inside the metal air battery module so as to additionally remove oxygen from the metal air battery module.

The auxiliary power source may be further configured to drive the oxygen supplying unit during the operational stop of the metal air battery module to supply air purified by the purifier of the oxygen supplying unit inside the metal air battery module so as to additionally remove oxygen from the metal air battery module.

The metal air battery system may further include an inert gas supplying unit configured to supply inert gas to inside the metal air battery module during an operational stop of the metal air battery module so as to remove at least some of oxygen from the metal air battery module.

The inert gas may include argon, helium, or nitrogen.

The inert gas supplying unit may be further configured to supply an electrolyte containing the inert gas to inside the metal air battery module.

The auxiliary power source may be further configured to drive the oxygen supplying unit during the operational stop of the metal air battery module to supply nitrogen separated and discharged by the separator of the oxygen supplying unit to inside the metal air battery module so as to additionally remove oxygen from the metal air battery module.

The auxiliary power source may be further configured to drive the oxygen supplying unit during the operational stop of the metal air battery module to supply air purified by the purifier of the oxygen supplying unit to inside the metal air battery module so as to additionally remove oxygen in the metal air battery module.

The discharge product may include at least one of $Li_2O_2$, LiOH, and $Li_2CO_3$.

The discharge product may include $Li_2O_2$.

The metal air battery module may include at least one battery cell, and the at least one battery cell may include a cathode, an anode, and an electrolyte.

The auxiliary power source may include at least one electrical energy generation and/or storage apparatus.

According to an aspect of another exemplary embodiment, a method of operating a metal air battery system including a metal air battery module configured to receive oxygen from an oxygen supplying unit and perform a discharge reaction, includes: stopping an operation of the oxygen supplying unit and the metal air battery module; charging the metal air battery module from a power source to thereby remove at least some of a discharge product from the metal air battery module auxiliary; and removing at least some of oxygen from the metal air battery module.

The removing of the oxygen from the metal air battery module may include removing the at least some of the oxygen from the metal air battery module by supplying nitrogen separated and discharged by a separator of the oxygen supplying unit to inside the metal air battery module while an auxiliary power source drives the oxygen supplying unit.

The removing of the at least some of oxygen from the metal air battery module may include removing the at least some of the oxygen from the metal air battery module by supplying air purified by a purifier of the oxygen supplying unit to inside the metal air battery module while an auxiliary power source drives the oxygen supplying unit.

The removing of the at least some of oxygen from the metal air battery module may include removing the at least some oxygen from the metal air battery module while another auxiliary power source drives the oxygen supplying unit.

The method may further include storing, in a nitrogen reservoir, nitrogen separated and discharged by the oxygen supplying unit during an operation of the metal air battery module.

The removing of the at least some oxygen from the metal air battery module may include removing the at least some oxygen from the metal air battery module by supplying nitrogen stored in the nitrogen reservoir.

The method may further include additionally removing the at least some of oxygen from the metal air battery module by supplying nitrogen separated and discharged by a separator of the oxygen supplying unit to inside the metal air battery module while an auxiliary power source drives the oxygen supplying unit.

The method may further include additionally removing the at least some of oxygen from the metal air battery module by supplying air purified by a purifier of the oxygen supplying unit to inside the metal air battery module while an auxiliary power source drives the oxygen supplying unit.

The removing of the at least some of oxygen from the metal air battery module may include removing the at least some oxygen from the metal air battery module by supplying inert gas to inside the metal air battery module via an inert gas supplying unit.

The inert gas may include argon, helium, or nitrogen.

The inert gas supplying unit may supply an electrolyte containing the inert gas to inside the metal air battery module.

The method may further include additionally removing the at least some of oxygen from the metal air battery module by supplying nitrogen separated and discharged by a separator of the oxygen supplying unit to inside the metal air battery module while an auxiliary power source drives the oxygen supplying unit.

The method may further include additionally removing the at least some of oxygen from the metal air battery module by supplying air purified by a purifier of the oxygen supplying unit to inside of the metal air battery module while an auxiliary power source drives the oxygen supplying unit.

The method may further include closing and storing the metal air battery module after removing the discharge product and oxygen.

The discharge product may include at least one of $Li_2O_2$, LiOH, and $Li_2CO_3$.

The auxiliary power source may include at least one electrical energy generation and/or storage apparatus.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
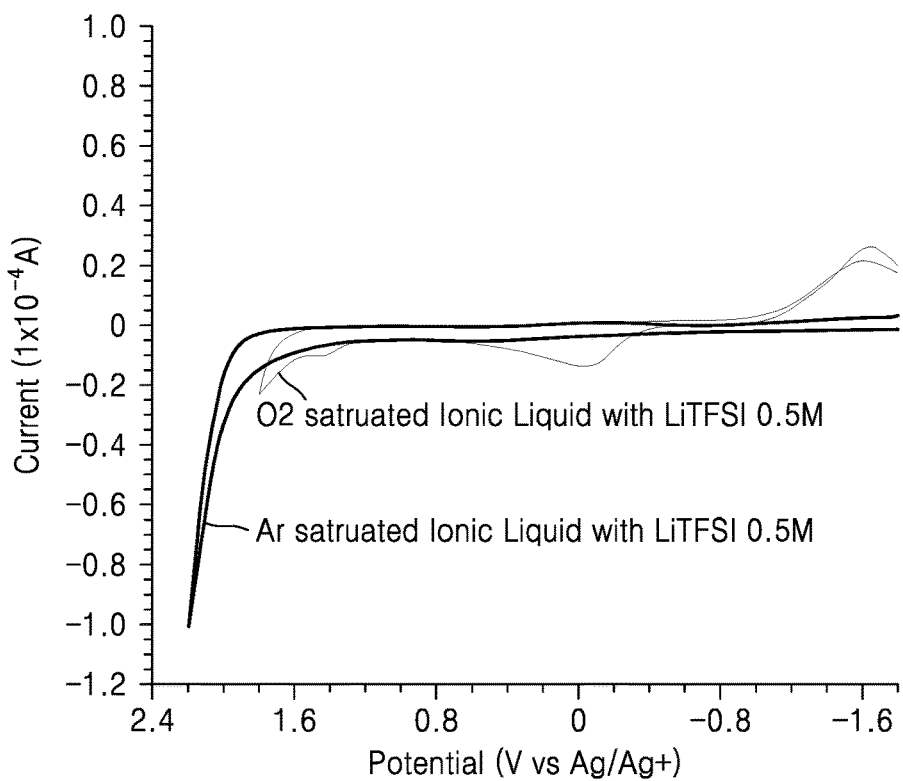
FIG. 1 is a graph of current ($1\times10^{-4}$ amperes (A)) versus potential (Volts (V) versus $Ag/Ag^+$) showing a result of measurement of electrochemical stability of an electrolyte saturated with oxygen and an electrolyte saturated with argon using cyclic current voltammetry.

Reference will now be made in detail to exemplary embodiments, examples of which are illustrated in the accompanying drawings, wherein like reference numerals refer to like elements throughout. Also, the size of each layer illustrated in the drawings may be exaggerated for convenience of explanation and clarity. In this regard, the present embodiments may have different forms and should not be construed as being limited to the descriptions set forth herein. Accordingly, the embodiments are merely described below, by referring to the figures, to explain aspects of the present description. In a layer structure, when a constituent element is disposed "above" or "on" to another constituent element, the constituent element may be only directly on the other constituent element or above the other constituent elements in a non-contact manner.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A lithium air battery uses lithium as an anode and oxygen, e.g., oxygen from the air, as an active material at a cathode. An electrolyte is provided between the cathode and the anode. In a lithium air battery using a non-aqueous electrolyte, a chemical reaction formula in a cell is as follows.

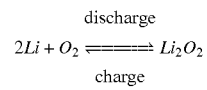

In a lithium air battery, during a discharge reaction, lithium ions and electrons are generated by an oxidation reaction of lithium metal, and the lithium ions move through an electrolyte and the electrons move toward a cathode along an external conductor. When oxygen, e.g., oxygen from external air, is supplied to the cathode and reduced by the electrons, $Li_2O_2$ that is a discharge product is generated. A charging reaction is carried out in an opposite direction to the discharge reaction.

While not wanting to be bound by theory, it is understood that when a lithium air battery is not operating, $Li_2O_2$ and $O_2$ remain in the lithium air battery and the $Li_2O_2$ and $O_2$ may deteriorate elements, for example, an electrolyte or a cathode material, of the lithium air battery. Also, $Li_2O_2$, which is a discharge product, generates a by-product such as $Li_2CO_3$ in an atmosphere of carbon and oxygen and the by-product may also deteriorate the elements of a lithium air battery. Alternatively, LiOH can be a discharge product in a lithium air battery using an aqueous electrolyte, and the LiOH may also deteriorate the elements of a lithium air battery.

FIG. 1 is a graph showing a result of measurement of electrochemical stability of an electrolyte saturated with oxygen and an electrolyte saturated with argon using a cyclic current voltammetry method. An ionic liquid comprising 0.5 molar (M) lithium bis(trifluoromethane)sulfonimide (LiTFSI) is used as the electrolyte in the embodiment of FIG. 1.

Referring to FIG. 1, it may be seen that an oxidation potential of an electrolyte saturated with oxygen is about 400 millivolts (mV) less than that of an electrolyte saturated with argon. This is because the electrolyte saturated with argon is more stable to oxidation. Accordingly, it may be seen from the above that the lithium air battery becomes more stable when the lithium air battery is saturated with an inert gas rather than with oxygen.

Figure 2A:
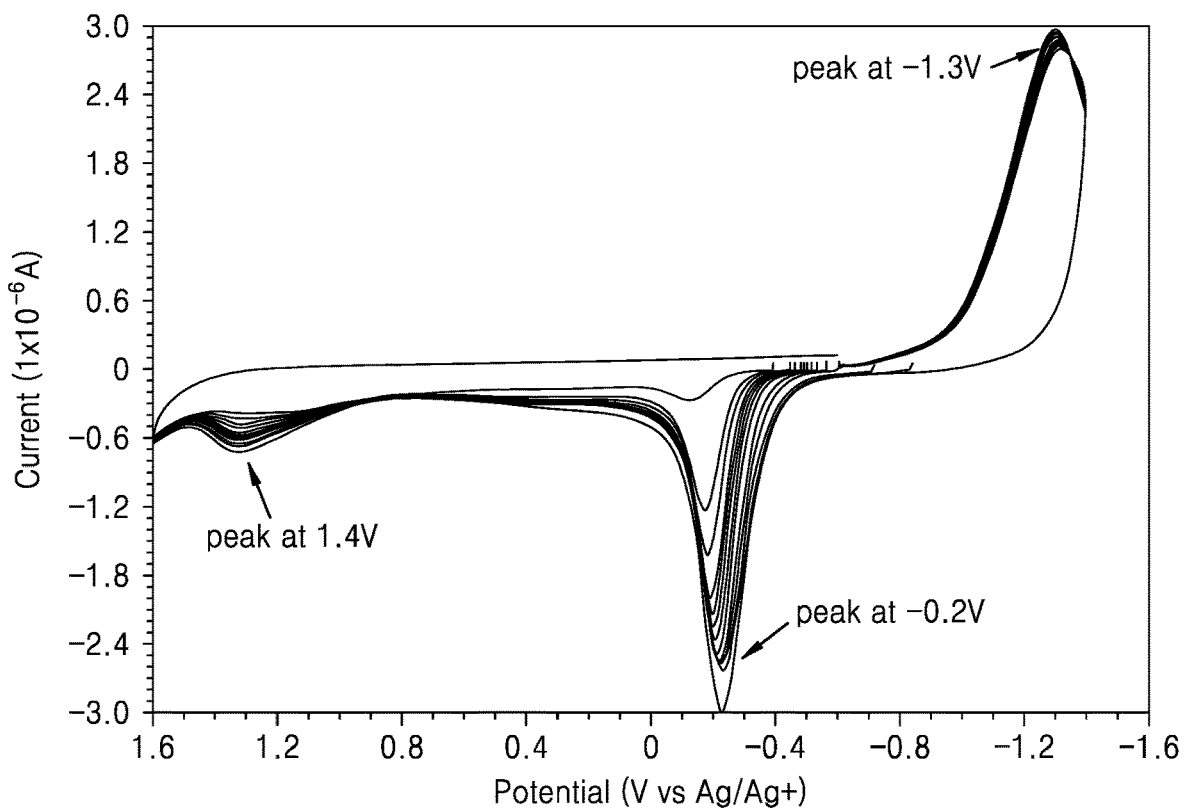
FIG. 2A is a graph of current ($1\times10^{-6}$ amperes (A)) versus potential (Volts (V) versus $Ag/Ag^+$) showing a result of analysis of an electrolyte including $Li_2O_2$ using a potential sweep method and a time vs. open circuit electric potential method.
Figure 2B:
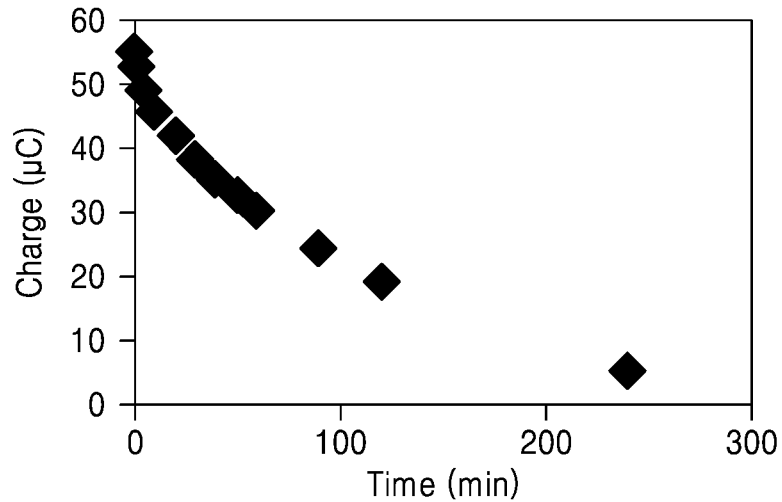
FIG. 2B is a graph of charge (microcoulombs, μC) versus time (minutes, min) showing a decrease in an amount of $Li_2O_2$ represented by an quantity of electric charge according to the passage of time.

FIG. 2A is a graph showing a result of measurement of an electrolyte including $Li_2O_2$ using a potential sweep method and a time vs. open circuit electric potential method. FIG. 2A shows how $Li_2O_2$ that is generated (indicated by the peak at −1.3V) is decomposed (indicated by the peak at −0.2V) and how a decomposed product is accumulated (indicated by the peak at 1.4V), in an electrolyte according to the passage of time. FIG. 2B shows how the quantity of $Li_2O_2$ represented by the quantity of charge (area under the peak −0.2V) decreases according to the passage of time. While not wanting to be bound by theory, it may be seen from the results shown in FIGS. 2A and 2B that $Li_2O_2$ in the electrolyte reacts with electrolyte according to the passage of time and generates a decomposed product, and that, when $Li_2O_2$ is removed, the decomposition reaction of the electrolyte may be restricted.

Figure 3:
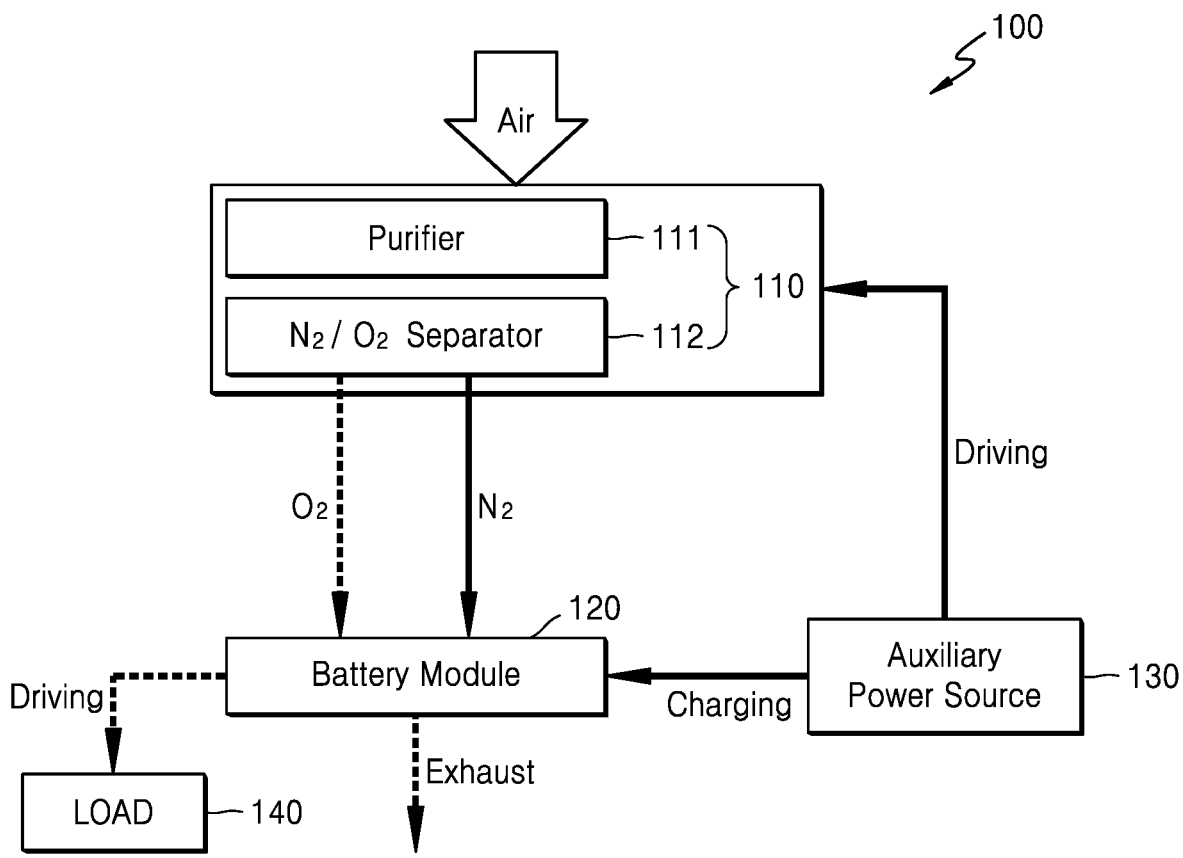
FIG. 3 is a block diagram schematically illustrating a metal air battery system according to an exemplary embodiment.

FIG. 3 is a block diagram schematically illustrating a metal air battery system 100 according to an exemplary embodiment.

Referring to FIG. 3, the metal air battery system 100 may include an oxygen supplying unit 110, a metal air battery module 120, and auxiliary power source 130. The oxygen supplying unit 110 separates oxygen from externally supplied air and supplies separated oxygen to the inside of the metal air battery module 120. Alternatively, the oxygen supplying unit may provide oxygen from another source, such as an oxygen tank. The oxygen supplying unit 110 may include a purifier 111 and a separator 112. The purifier 111 removes moisture and impurities from externally supplied air, thereby supplying purified air to the separator 112. Air contains about 21% oxygen, about 77% nitrogen, and other gases are contained in an amount of about 2%. The separator 112 separates the air purified by the purifier 111 into nitrogen and oxygen.

The metal air battery module 120 may include a plurality of cells (not shown). Each of the cells performs a discharge reaction using the oxygen supplied by the oxygen supplying unit 110. Each cell may include a cathode, an anode, and an electrolyte. The cathode uses oxygen as an active material, where an oxidation-reduction reaction of oxygen occurs. An oxidation-reduction reaction of metal occurs at the anode. The electrolyte enables conduction of metal ions between the cathode and the anode.

The cathode may include a porous conductive material. For example, the cathode may include a porous carbon-based material such as carbon black, graphite, graphene, active carbon, carbon nanotube, carbon fiber, or a combination thereof. Also, the cathode may include, for example, a metal conductive material such as metal fiber or metal mesh, or metal powder such as copper, silver, nickel, aluminum. However, the present disclosure is not limited thereto and the cathode may include any suitable conductive material. The above conducive materials may be used solely or in a combination thereof. The cathode may further include a binder, an aqueous electrolyte or a non-aqueous electrolyte, and optionally a catalyst to facilitate an oxidation-reduction reaction.

The anode may include a material capable of including and discharging metal ions. The anode may include, for example, lithium (Li), sodium (Na), zinc (Zn), potassium (K), calcium (Ca), magnesium (Mg), iron (Fe), aluminum (Al), an alloy thereof, or combination thereof. The electrolyte may include a material which conducts metal ions and may include a non-aqueous electrolyte, an aqueous electrolyte, a solid electrolyte, or a combination thereof.

The auxiliary power source 130 may charge the metal air battery module 120 when the operation of the metal air battery module 120 is stopped, as is further disclosed below. The auxiliary power source 130 may charge at least a part of the metal air battery module 120 to remove a discharge product. The auxiliary power source 130 may include at least one electrical energy generation and/or storage apparatus. For example, the auxiliary power source 130 may include a primary battery, a secondary battery, a solar battery, a capacitor, or a combination thereof. However, this is merely exemplary and the auxiliary power source 130 may include any suitable type of electrical energy generation and/or storage apparatus.

The auxiliary power source 130 may additionally drive the oxygen supplying unit 110 when the operation of the metal air battery module 120 is stopped. As such, when the auxiliary power source 130 drives the oxygen supplying unit 110, the oxygen supplying unit 110 separates and supplies nitrogen. When the separated nitrogen is supplied to the metal air battery module 120, at least some of the oxygen remaining in the metal air battery module 120 may be removed by purging.

In the following description, a method of operating the metal air battery system 100 of FIG. 3 is disclosed in further detail.

First, a method of operating the metal air battery system 100 when the metal air battery module 120 is operated to perform a discharge reaction is described. In FIG. 3, an operation of the metal air battery system 100 while the metal air battery module 120 performs a discharge reaction is indicated by a dotted arrow. The same is true with the other drawings.

First, when the external air flows in the oxygen supplying unit 110, the purifier 111 of the oxygen supplying unit 110 removes moisture and impurities from the incoming air and discharges purified air. The separator 112 separates the air purified by the purifier 111 into nitrogen and oxygen, and supplies the separated and discharged oxygen to the metal air battery module 120.

Next, the metal air battery module 120 performs a discharge reaction using the oxygen supplied by the oxygen supplying unit 110.

For example, in the case of a lithium air battery using a non-aqueous electrolyte, a discharge reaction formula in a cell is expressed as follows.

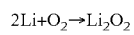

$$2Li + O_2 \rightarrow Li_2O_2 \qquad \text{Discharge Reaction Formula}$$

As such, when a cell performs a discharge reaction, a $Li_2O_2$ discharge product may be formed. The electrical energy generated through the discharge reaction may be used to drive various types of loads 140. Alternatively, when an aqueous electrolyte is in use, a LiOH discharge product may be formed.

As desired, the operation of a lithium air battery module may be stopped. As such, when the operation of the lithium air battery module is stopped, the discharge product, such as $Li_2O_2$ or LiOH, as well as oxygen, may remain in the lithium air battery module, and the discharge product and oxygen may deteriorate the elements of the lithium air battery module. In the lithium air battery, $Li_2O_2$, which is a discharge product, may generate a by-product such as $Li_2CO_3$ under a carbon and oxygen atmosphere. The by-product may also deteriorate the elements of the lithium air battery module. Accordingly, when the operation of the lithium air battery module is stopped, the discharge product, the oxygen, and the by-product remaining in the lithium air battery module are desirably removed.

In the following description, the operation of the metal air battery module 120, and a method of operating the metal air battery system 100, are further described. A solid arrow in FIG. 3 indicates an operation process of the metal air battery system 100 when the operation of the metal air battery module 120 is stopped, which is the same in the following drawings.

When the operation of the metal air battery module 120 is stopped, the operation of the oxygen supplying unit 110 is also stopped and thus the oxygen supplying unit 110 no longer supplies the oxygen to the metal air battery module 120.

In a state in which the operation of the metal air battery module 120 is stopped, the auxiliary power source 130 may remove at least some of the discharge product remaining in the metal air battery module 120 by charging the metal air battery module 120. In order to remove the discharge product as much as possible, the auxiliary power source 130 may fully charge the metal air battery module 120.

For example, for a lithium air battery using a non-aqueous electrolyte, a charge reaction formula occurring in a battery cell by the auxiliary power source 130 is expressed as follows.

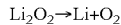   Charge Reaction Formula $$Li_2O_2 \rightarrow Li + O_2$$

As such, when the cell is charged by the auxiliary power source 130, the discharge product, such as $Li_2O_2$, is reduced. Also, as the discharge product, such as $Li_2O_2$, is removed, generation of the by-product such as $Li_2CO_3$ may be restricted. Alternatively, when the aqueous electrolyte is in use, the discharge product such as LiOH may be reduced.

In the charge process of the metal air battery module 120, at least some of the discharge product may be removed. In the process, the quantity of oxygen in the metal air battery module 120 may be increased and the oxygen may deteriorate the elements of the metal air battery module 120. Thus, the oxygen remaining in the metal air battery module 120 may be desirably removed. To this end, as the auxiliary power source 130 additionally drives the oxygen supplying unit 110, the oxygen supplying unit 110 may supply nitrogen to the metal air battery module 120. In other words, when the auxiliary power source 130 drives the oxygen supplying unit 110, the external air is purified by the purifier 111 and then separated by the separator 112 into nitrogen and oxygen. When nitrogen that is separated and discharged by the separator 112 is supplied to the metal air battery module 120, the oxygen remaining in the metal air battery module 120 may be removed by being exhausted to the outside by purging.

As such, as the auxiliary power source 130 drives the oxygen supplying unit 110, at least some of the oxygen remaining in the metal air battery module 120 may be removed. Next, the metal air battery module 120, from which the discharge product and the oxygen are removed, may be maintained by being closed from the outside.

As is further described above, during the operational stop of the metal air battery module 120, as the auxiliary power source 130 charges the metal air battery module 120, the discharge product remaining in the metal air battery module 120 is removed, and as the auxiliary power source 130 additionally drives the oxygen supplying unit 110 to supply nitrogen to the inside of the metal air battery module 120, the oxygen remaining in the metal air battery module 120 may be removed. Accordingly, during the operational stop of the metal air battery module 120, the deterioration of the elements of the metal air battery module 120 due to the discharge product or the oxygen may be prevented.

Figure 4:
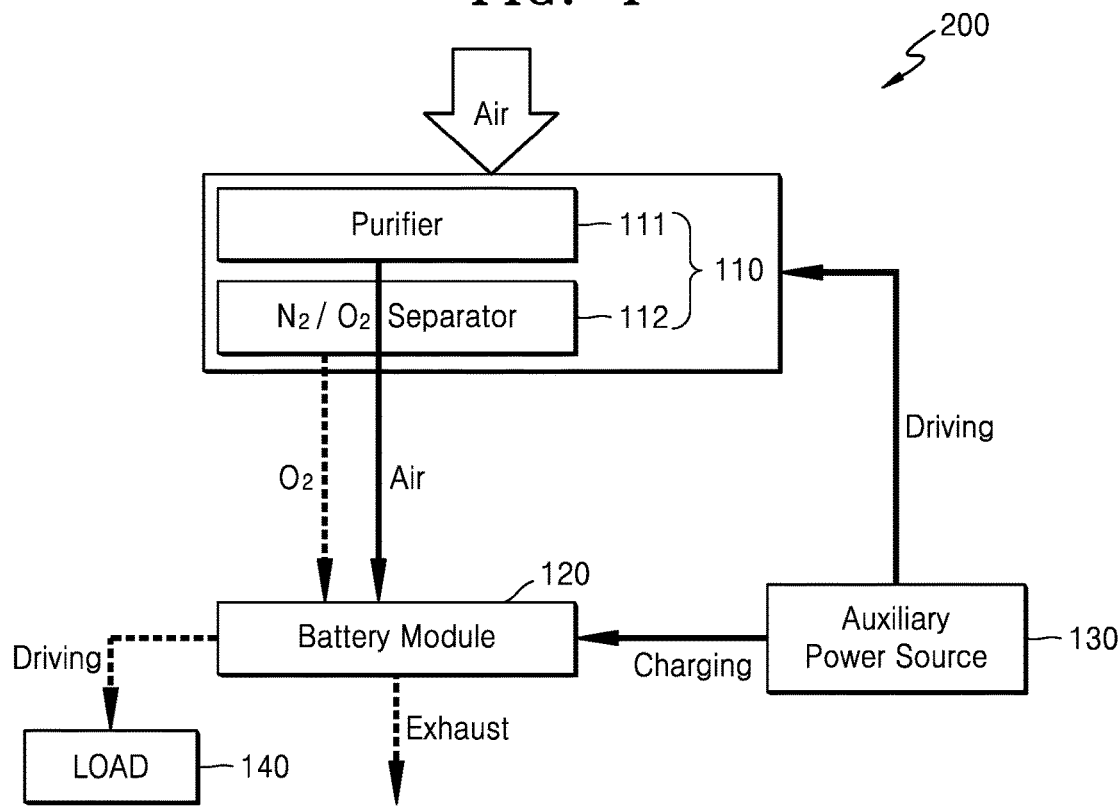
FIG. 4 is a block diagram schematically illustrating a metal air battery system according to another exemplary embodiment.

FIG. 4 is a block diagram schematically illustrating a metal air battery system 200 according to another exemplary embodiment. The metal air battery system 200 of FIG. 4 is the same as the metal air battery system 100 of FIG. 3, except that the auxiliary power source 130 drives the oxygen supplying unit 110 to supply purified air to the metal air battery module 120.

Referring to FIG. 4, when the operation of the metal air battery module 120 is stopped, the auxiliary power source 130 may charge the metal air battery module 120. At least some of the discharge product remaining in the metal air battery module 120 may be removed through the charge process of the metal air battery module 120. The auxiliary power source 130 may fully charge the metal air battery module 120 in order to remove the discharge product. The auxiliary power source 130 may include at least one electrical energy generation and/or storage apparatus.

When the operation of the metal air battery module 120 is stopped, the auxiliary power source 130 may additionally drive the oxygen supplying unit 110. The auxiliary power source 130 drives the purifier 111 of the oxygen supplying unit 110 so that the air purified by the purifier 111 may be discharged. When the discharged air is supplied to the metal air battery module 120, the quantity of the oxygen remaining in the metal air battery module 120 may be reduced.

As is further described above, during the operational stop of the metal air battery module 120, as the auxiliary power source 130 charges the metal air battery module 120, the discharge product remaining in the metal air battery module 120 is removed. As the auxiliary power source 130 additionally drives the oxygen supplying unit 110 to supply air to the metal air battery module 120, the quantity of the oxygen remaining in the metal air battery module 120 may be reduced. Accordingly, during the operational stop of the metal air battery module 120, the deterioration of the elements of the metal air battery module 120 due to the discharge product or the oxygen may be prevented.

Figure 5:
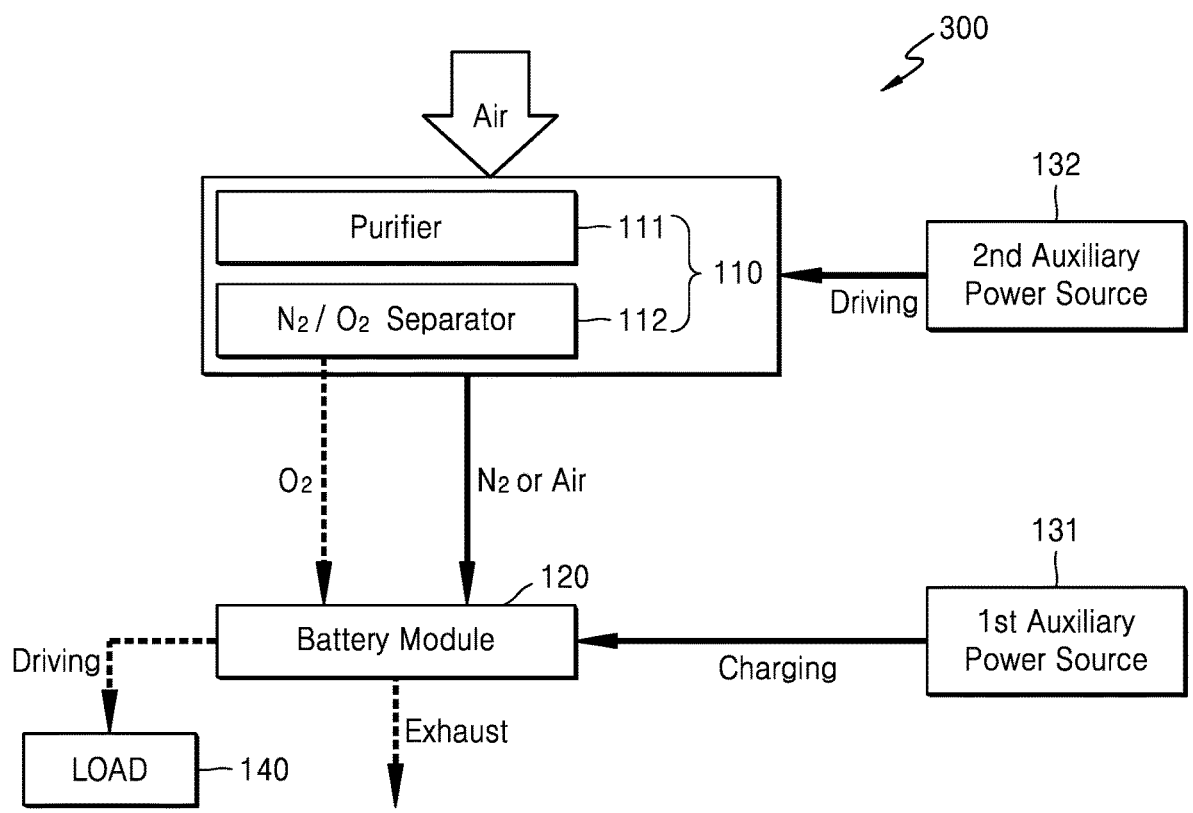
FIG. 5 is a block diagram schematically illustrating a metal air battery system according to another exemplary embodiment.

FIG. 5 is a block diagram schematically illustrating a metal air battery system 300 according to another exemplary embodiment. The metal air battery system 300 of FIG. 5 is the same as the metal air battery systems 100 and 200 of FIGS. 3 and 4, except that the metal air battery system 300 includes a second auxiliary power source 132 for driving the oxygen supplying unit 110 during the operational stop of the metal air battery module 120.

Referring to FIG. 5, the metal air battery system 300 may include the oxygen supplying unit 110, the metal air battery module 120, a first auxiliary power source 131, and the second auxiliary power source 132. The oxygen supplying unit 110 may include the purifier 111 for removing moisture and impurities from externally supplied air, and the separator 112 for separating the air purified by the purifier 111 into nitrogen and oxygen. The metal air battery module 120 may include a plurality of cells (not shown). Each of the cells performs a discharge reaction using the oxygen supplied by the oxygen supplying unit 110.

The first auxiliary power source 131 charges the metal air battery module 120 during the operational stop of the metal air battery module 120. The first auxiliary power source 131 may fully charge the metal air battery module 120 in order to remove the discharge product. The first auxiliary power source 131 may include at least one electrical energy generation and/or storage apparatus.

During the operational stop of the metal air battery module 120, the second auxiliary power source 132 drives the oxygen supplying unit 110. Like the first auxiliary power source 131, the second auxiliary power source 132 may include at least one electrical energy generation and/or storage apparatus. When the second auxiliary power source 132 drives the oxygen supplying unit 110, the oxygen supplying unit 110 discharges nitrogen or air and the discharged nitrogen or air is supplied to the inside of the metal air battery module 120 so that at least some of the oxygen remaining in the metal air battery module 120 may be removed.

In the following description, a method of operating the metal air battery system 300 during the operational stop of the metal air battery module 120 is further described.

When the operation of the metal air battery module 120 is stopped, the operation of the oxygen supplying unit 110 is also stopped and thus the oxygen supplying unit 110 no longer supplies the oxygen to the metal air battery module 120. As such, in the state in which the operation of the metal air battery module 120 is stopped, when the first auxiliary power source 131 charges the metal air battery module 120, at least some of the discharge product remaining in the metal air battery module 120 may be removed. To remove the discharge product, the first auxiliary power source 131 may fully charge the metal air battery module 120.

Also, in the state in which the operation of the metal air battery module 120 is stopped, when the second auxiliary power source 132 drives the oxygen supplying unit 110, at least some of the oxygen remaining in the metal air battery module 120 may be removed. As the nitrogen discharged by the separator 112 of the oxygen supplying unit 110 is supplied to the metal air battery module 120, or the purified air discharged by the purifier 111 of the oxygen supplying unit 110 is supplied to the metal air battery module 120, the oxygen in the metal air battery module 120 may be removed. Next, the metal air battery module 120 where the discharge product and the oxygen are removed may be maintained by being closed from the outside.

As is further described above, as the first auxiliary power source 131 charges the metal air battery module 120, the discharge product remaining in the metal air battery module 120 is removed, and as the second auxiliary power source 132 drives the oxygen supplying unit 110 to supply nitrogen or air to the metal air battery module 120, the oxygen remaining in the metal air battery module 120 is removed. Accordingly, during the operational stop of the metal air battery module 120, the deterioration of the elements of the metal air battery module 120 due to the discharge product or the oxygen may be prevented.

Figure 6:
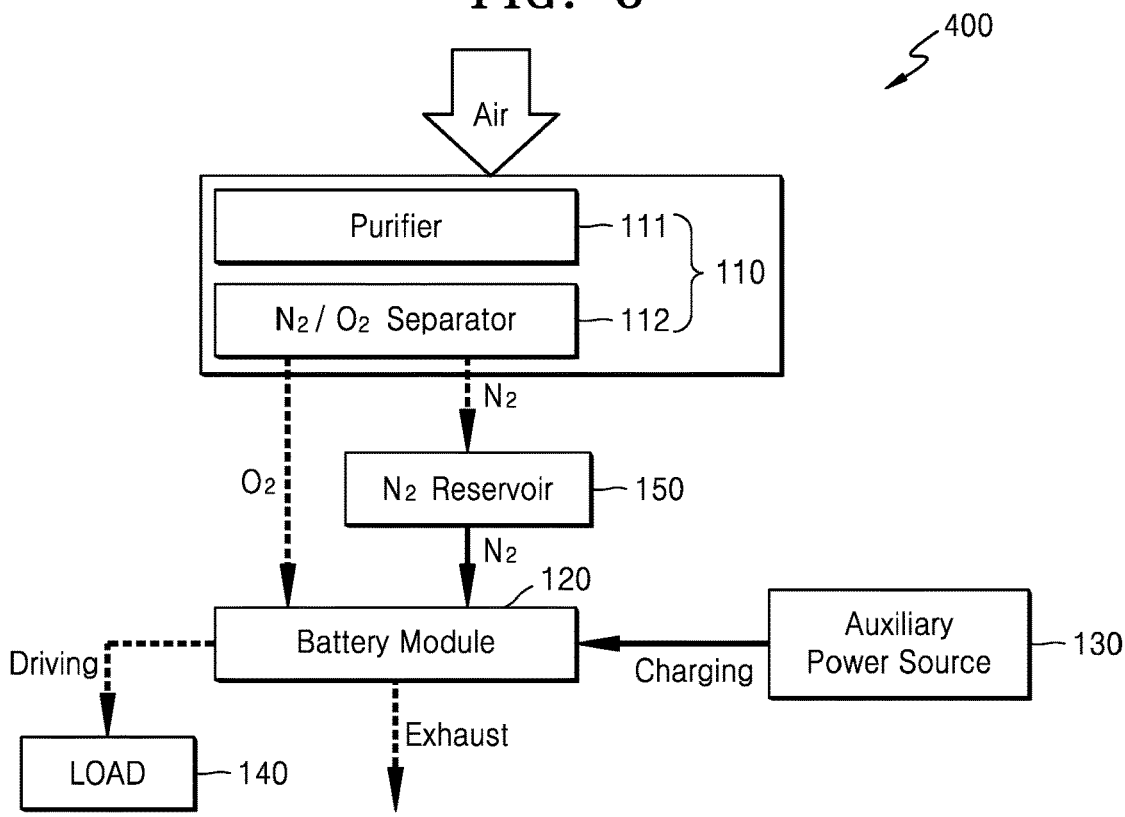
FIG. 6 is a block diagram schematically illustrating a metal air battery system according to another exemplary embodiment.

FIG. 6 is a block diagram schematically illustrating a metal air battery system 400 according to another exemplary embodiment;

Referring to FIG. 6, the metal air battery system 400 may include the oxygen supplying unit 110, a nitrogen reservoir 150, the metal air battery module 120, and the auxiliary power source 130. The oxygen supplying unit 110 may include the purifier 111 for removing moisture and impurities from externally supplied air, and the separator 112 for separating the air purified by the purifier 111 into nitrogen and oxygen.

The nitrogen reservoir 150 may store the nitrogen separated and discharged by the separator 112 of the oxygen supplying unit 110 during the operation of the metal air battery module 120. As is further described below, during the operational stop of the metal air battery module 120, the nitrogen stored in the nitrogen reservoir 150 is supplied to the metal air battery module 120 to remove the oxygen remaining in the metal air battery module 120.

The metal air battery module 120 may include a plurality of cells (not shown). Each of the cells performs a discharge reaction using the oxygen supplied by the oxygen supplying unit 110. Each of the cells may include a cathode, an anode, and an electrolyte. The cathode uses oxygen as an active material, where an oxidation-reduction reaction of oxygen occurs. An oxidation-reduction reaction of metal occurs at the anode. The electrolyte enables conduction of metal ions between the cathode and the anode.

The auxiliary power source 130 may charge the metal air battery module 120 during the operational stop of the metal air battery module 120. To remove the discharge product, the auxiliary power source 130 may fully charge the metal air battery module 120. The auxiliary power source 130 may include at least one electrical energy generation and/or storage apparatus. For example, the auxiliary power source 130 may include a primary battery, a secondary battery, a solar battery, or a capacitor. . However, this is merely exemplary and the auxiliary power source 130 may include various types of an electrical energy generation and/or storage apparatus.

In the following description, a method of operating the metal air battery system 400 of FIG. 6 is described in further detail.

First, a method of operating the metal air battery system 400 when the metal air battery module 120 is operated to perform a discharge reaction is described. When the external air is supplied to the inside of the oxygen supplying unit 110, the purifier 111 of the oxygen supplying unit 110 removes moisture and impurities from the supplied air and discharges purified air. The separator 112 separates the air purified by the purifier 111 into nitrogen and oxygen. The oxygen separated and discharged by the oxygen supplying unit 110 is supplied to the metal air battery module 120. The nitrogen separated and discharged by the oxygen supplying unit 110 may be stored in the nitrogen reservoir 150.

The metal air battery module 120 may perform a discharge reaction using the oxygen supplied by the oxygen supplying unit 110. When the discharge reaction is performed, the discharged product, such as $Li_2O_2$ or $LiOH$, may be generated in the metal air battery module 120.

Next, a method of operating the metal air battery system 400 during the operational stop of the metal air battery module 120 is described.

When the operation of the metal air battery module 120 is stopped, the operation of the oxygen supplying unit 110 is also stopped and thus the oxygen supplying unit 110 no longer supplies the oxygen to the metal air battery module 120. As such, in the state in which the operation of the metal air battery module 120 is stopped, the auxiliary power source 130 charges the metal air battery module 120. Accordingly, at least some of the discharge product remaining in the metal air battery module 120 may be removed. To remove the discharge product, the auxiliary power source 130 may fully charge the metal air battery module 120.

In the state in which the operation of the metal air battery module 120 is stopped, the nitrogen stored in the nitrogen reservoir 150 during the discharge process may be supplied to the metal air battery module 120. Accordingly, at least some of the oxygen remaining in the metal air battery module 120 may be removed by being exhausted to the outside by purging. As such, at least some of the oxygen may be removed by supplying the nitrogen in the nitrogen reservoir 150 to the metal air battery module 120. Next, the metal air battery module 120 where the discharge product and the oxygen are removed may be kept by being closed from the outside.

As is further described above, as the auxiliary power source 130 charges the metal air battery module 120, the discharge product remaining in the metal air battery module 120 may be removed. As the nitrogen stored in the nitrogen reservoir 150 is supplied to the metal air battery module 120, the oxygen remaining in the metal air battery module 120 may be removed. Accordingly, during the operational stop of the metal air battery module 120, the deterioration of the elements of the metal air battery module 120 may be prevented.

Figure 7:
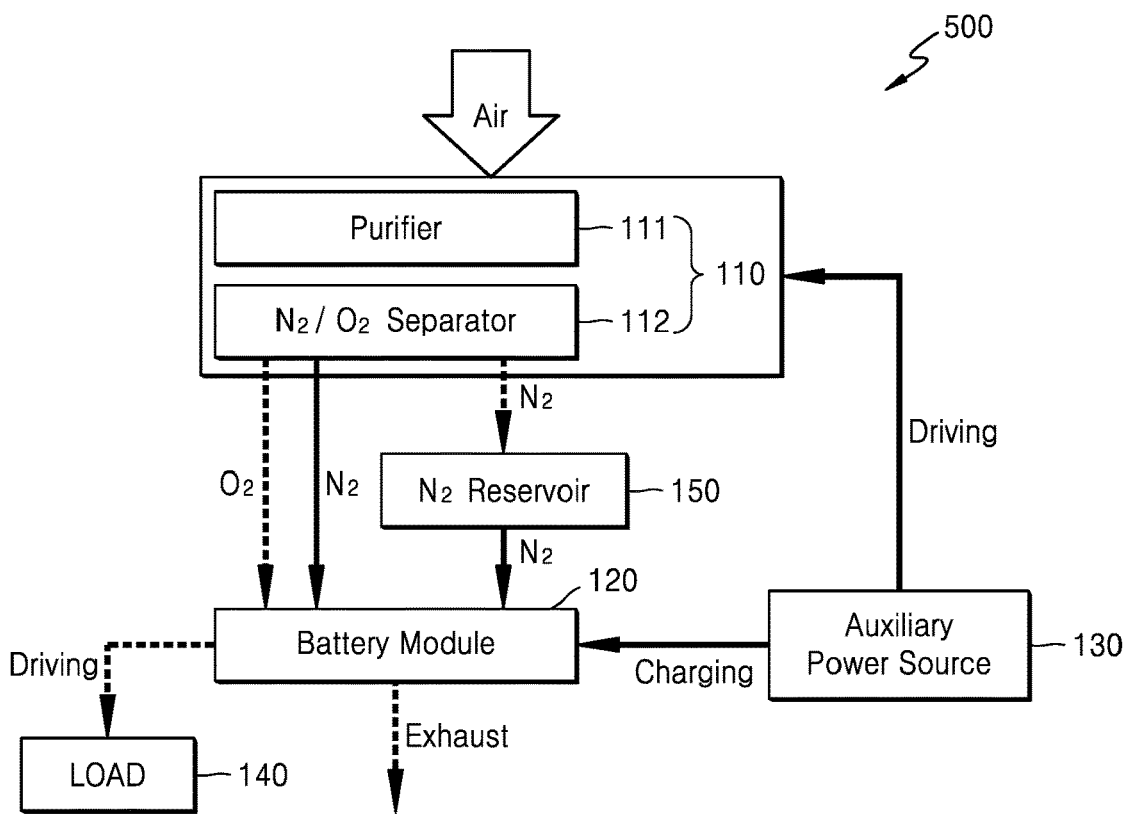
FIG. 7 is a block diagram schematically illustrating a metal air battery system according to another exemplary embodiment.

FIG. 7 is a block diagram schematically illustrating a metal air battery system 500 according to another exemplary embodiment. The metal air battery system 500 of FIG. 7 is the same as the metal air battery system 400 of FIG. 6, except that the auxiliary power source 130 drives the oxygen supplying unit 110 so that the oxygen supplying unit 110 additionally supplies nitrogen to the metal air battery module 120.

Referring to FIG. 7, the nitrogen reservoir 150 may store the nitrogen that is separated and discharged by the separator 112 of the oxygen supplying unit 110 during the operation of the metal air battery module 120. As is further described below, during the operational stop of the metal air battery module 120, the nitrogen stored in the nitrogen reservoir 150 is supplied to the metal air battery module 120 to remove the oxygen remaining in the metal air battery module 120.

When the operation of the metal air battery module 120 is stopped, the auxiliary power source 130 may charge the metal air battery module 120. Through the charge process of the metal air battery module 120, at least some of the discharge product remaining in the metal air battery module 120 may be removed. The auxiliary power source 130 may fully charge the metal air battery module 120 to remove the discharge product. The auxiliary power source 130 may include at least one electrical energy generation and/or storage apparatus.

When the operation of the metal air battery module 120 is stopped, the auxiliary power source 130 may additionally drive the oxygen supplying unit 110. When the auxiliary power source 130 drives the oxygen supplying unit 110, the separator 112 separates and discharges nitrogen and the discharged nitrogen is supplied to the metal air battery module 120, thereby additionally removing the oxygen remaining in the metal air battery module 120.

In the following description, a method of operating the metal air battery system 500 during the operational stop of the metal air battery module 120 is further described.

When the operation of the metal air battery module 120 is stopped, the operation of the oxygen supplying unit 110 is also stopped and thus the oxygen supplying unit 110 no longer supplies the oxygen to the metal air battery module 120. As such, in the state in which the operation of the metal air battery module 120 is stopped, when the auxiliary power source 130 charges the metal air battery module 120, at least some of the discharge product remaining in the metal air battery module 120 may be removed. To remove the discharge product, the auxiliary power source 130 may fully charge the metal air battery module 120.

In the state in which the operation of the metal air battery module 120 is stopped, as the nitrogen stored in the nitrogen reservoir 150 is supplied to the metal air battery module 120, the oxygen remaining in the metal air battery module 120 may be removed by purging. As the auxiliary power source 130 additionally drives the oxygen supplying unit 110, the oxygen remaining in the metal air battery module 120 may be additionally removed. In other words, when the auxiliary power source 130 drives the oxygen supplying unit 110, the nitrogen that is separated and discharged by the separator 112 of the oxygen supplying unit 110 may be supplied to the metal air battery module 120, and as a result, the oxygen remaining in the metal air battery module 120 may be additionally removed. Next, the metal air battery module 120 where the discharge product and the oxygen are removed may be maintained by being closed from the outside.

As is further described above, as the auxiliary power source 130 charges the metal air battery module 120, the discharge product remaining in the metal air battery module 120 may be removed. As the nitrogen stored in the nitrogen reservoir 150 and the nitrogen discharged by the oxygen supplying unit 110 driven by the auxiliary power source 130 are supplied to the metal air battery module 120, the oxygen remaining in the metal air battery module 120 may be more effectively removed.

Figure 8:
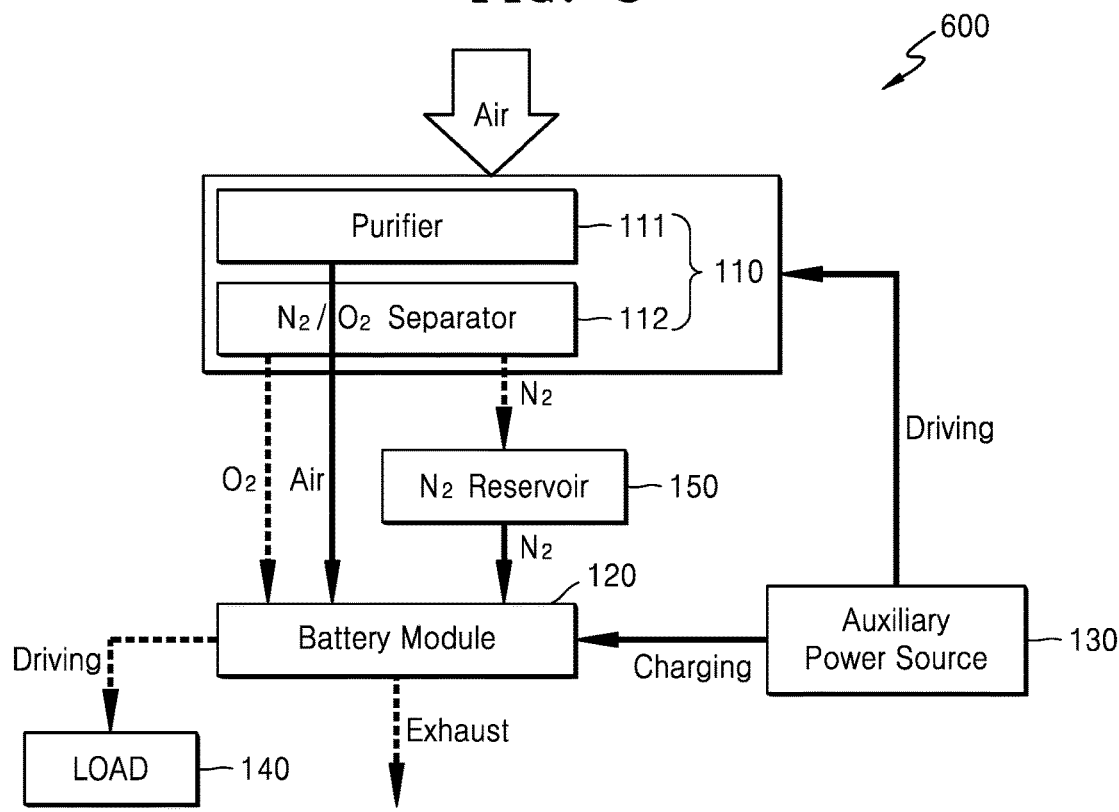
FIG. 8 is a block diagram schematically illustrating a metal air battery system according to another exemplary embodiment.

FIG. 8 is a block diagram schematically illustrating a metal air battery system 600 according to another exemplary embodiment. The metal air battery system 600 of FIG. 8 is the same as the metal air battery system 500 of FIG. 7, except that the auxiliary power source 130 drives the oxygen supplying unit 110 so that the oxygen supplying unit 110 supplies the purified air to the metal air battery module 120.

Referring to FIG. 8, during the operation of the metal air battery module 120, the nitrogen reservoir 150 may store the nitrogen that is separated and discharged by the separator 112 of the oxygen supplying unit 110. As is further described below, during the operational stop of the metal air battery module 120, the nitrogen stored in the nitrogen reservoir 150 is supplied to the metal air battery module 120 to remove the oxygen remaining in the metal air battery module 120.

During the operational stop of the metal air battery module 120, the auxiliary power source 130 may charge the metal air battery module 120. At least some of the discharge product remaining in the metal air battery module 120 may be removed through the charge operation of the metal air battery module 120. The auxiliary power source 130 may include at least one electrical energy generation and/or storage apparatus.

During the operational stop of the metal air battery module 120, the auxiliary power source 130 may additionally drive the oxygen supplying unit 110. The auxiliary power source 130 drives the oxygen supplying unit 110 to discharge the air purified by the purifier 111, and the discharged purified air is supplied to the metal air battery module 120. Accordingly, the oxygen remaining in the metal air battery module 120 may be additionally removed.

As is further described above, as the auxiliary power source 130 charges the metal air battery module 120, the discharge product remaining in the metal air battery module 120 may be removed. As the nitrogen stored in the nitrogen reservoir 150 and the air discharged by the oxygen supplying unit 110 driven by the auxiliary power source 130 are supplied to the metal air battery module 120, the oxygen remaining in the metal air battery module 120 may be more effectively removed.

Figure 9:
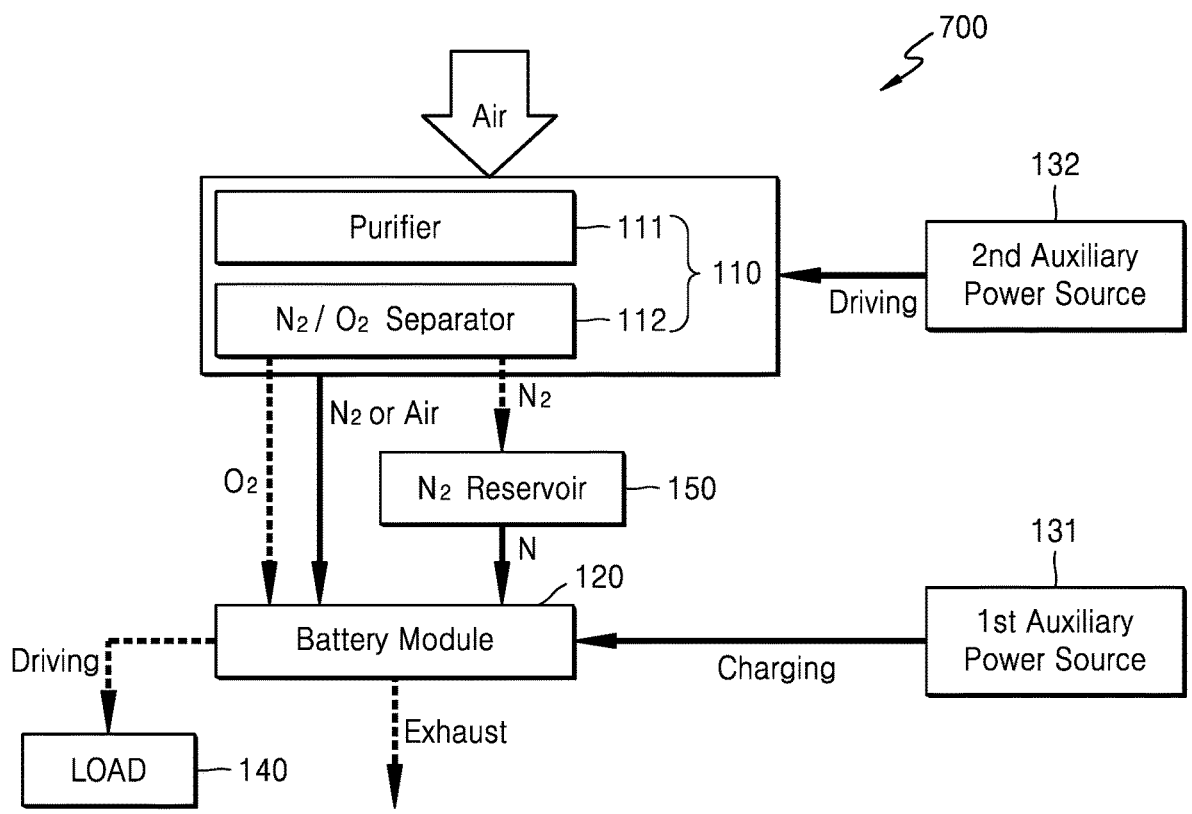
FIG. 9 is a block diagram schematically illustrating a metal air battery system according to another exemplary embodiment.

FIG. 9 is a block diagram schematically illustrating a metal air battery system 700 according to another exemplary embodiment. The metal air battery system 700 of FIG. 9 is the same as the metal air battery systems 500 and 600 of FIGS. 7 and 8, except that the metal air battery system 700 includes the second auxiliary power source 132 for driving the oxygen supplying unit 110 during the operational stop of the metal air battery module 120.

Referring to FIG. 9, the metal air battery system 700 may include the oxygen supplying unit 110, the nitrogen reservoir 150, the metal air battery module 120, the first auxiliary power source 131, and the second auxiliary power source 132. The oxygen supplying unit 110 may include the purifier 111 for removing moisture and impurities from externally supplied air, and the separator 112 for separating the air purified by the purifier 111 into nitrogen and oxygen.

The nitrogen reservoir 150 may store the nitrogen that is separated and discharged by the separator 112 of the oxygen supplying unit 110 during the operation of the metal air battery module 120. During the operational stop of the metal air battery module 120, the nitrogen stored in the nitrogen reservoir 150 is supplied to the metal air battery module 120 to remove at least some of the oxygen remaining in the metal air battery module 120. The metal air battery module 120 may include a plurality of cells (not shown). Each of the cells performs a discharge reaction using the oxygen supplied by the oxygen supplying unit 110.

When the operation of the metal air battery module 120 is stopped, the first auxiliary power source 131 may charge the metal air battery module 120. The first auxiliary power source 131 may include at least one electrical energy generation and/or storage apparatus. For example, the first auxiliary power source 131 may include a primary battery, a secondary battery, a solar battery, or a capacitor. However, this is merely exemplary and the first auxiliary power source 131 may include any suitable type of an electrical energy generation and/or storage apparatus.

When the operation of the metal air battery module 120 is stopped, the second auxiliary power source 132 may drive the oxygen supplying unit 110. Like the first auxiliary power source 131, the second auxiliary power source 132 may include at least one electrical energy generation and/or storage apparatus. When the second auxiliary power source 132 drives the oxygen supplying unit 110, the oxygen supplying unit 110 discharges nitrogen or air and the discharged nitrogen or air is supplied to the inside of the metal air battery module 120 so that at least some of the oxygen remaining in the metal air battery module 120 may be removed.

In the following description, a method of operating the metal air battery system 700 of FIG. 9 is further described.

First, a method of operating the metal air battery system 700 when the metal air battery module 120 is operated to perform a discharge reaction is further described. When external air is supplied to the inside of the oxygen supplying unit 110, the purifier 111 of the oxygen supplying unit 110 removes moisture and impurities from the supplied air and discharges purified air. Then, the separator 112 separates the air purified by the purifier 111 into nitrogen and oxygen. The oxygen separated and discharged by the oxygen supplying unit 110 is supplied to the metal air battery module 120. The nitrogen separated and discharged by the oxygen supplying unit 110 is stored in the nitrogen reservoir 150.

The metal air battery module 120 performs a discharge reaction using the oxygen supplied by the oxygen supplying unit 110. When the discharge reaction is performed, the discharged product, such as $Li_2O_2$ or $LiOH$, may be generated in the metal air battery module 120.

Next, a method of operating the metal air battery system 700 during the operational stop of the metal air battery module 120 is further described.

When the operation of the metal air battery module 120 is stopped, the operation of the oxygen supplying unit 110 is also stopped and thus the oxygen supplying unit 110 no longer supplies the oxygen to the metal air battery module 120. As such, in the state in which the operation of the metal air battery module 120 is stopped, the first auxiliary power source 131 charges the metal air battery module 120. Accordingly, at least some of the discharge product remaining in the metal air battery module 120 may be removed. To remove the discharge product, the first auxiliary power source 131 may fully charge the metal air battery module 120.

In the state in which the operation of the metal air battery module 120 is stopped, during the discharge process, the nitrogen stored in the nitrogen reservoir 150 is supplied to the metal air battery module 120. Accordingly, at least some of the oxygen remaining in the metal air battery module 120 may be exhausted to the outside and removed.

Also, in the state in which the operation of the metal air battery module 120 is stopped, as the second auxiliary power source 132 drives the oxygen supplying unit 110, the oxygen remaining in the metal air battery module 120 may be additionally removed. As the nitrogen discharged by the separator 112 of the oxygen supplying unit 110 is supplied to the metal air battery module 120 or the air discharged and purified by the purifier 111 of the oxygen supplying unit 110 is supplied to the metal air battery module 120, the oxygen in the metal air battery module 120 may be additionally removed. Next, the metal air battery module 120 where the discharge product and the oxygen are removed may be kept by being closed from the outside.

As described above, as the first auxiliary power source 131 charges the metal air battery module 120, the discharge product remaining in the metal air battery module 120 may be removed. As the nitrogen stored in the nitrogen reservoir 150 and the nitrogen or air discharged by the oxygen supplying unit 110 driven by the second auxiliary power source 132 is supplied to the metal air battery module 120, the oxygen remaining in the metal air battery module 120 may be more effectively removed.

Figure 10:
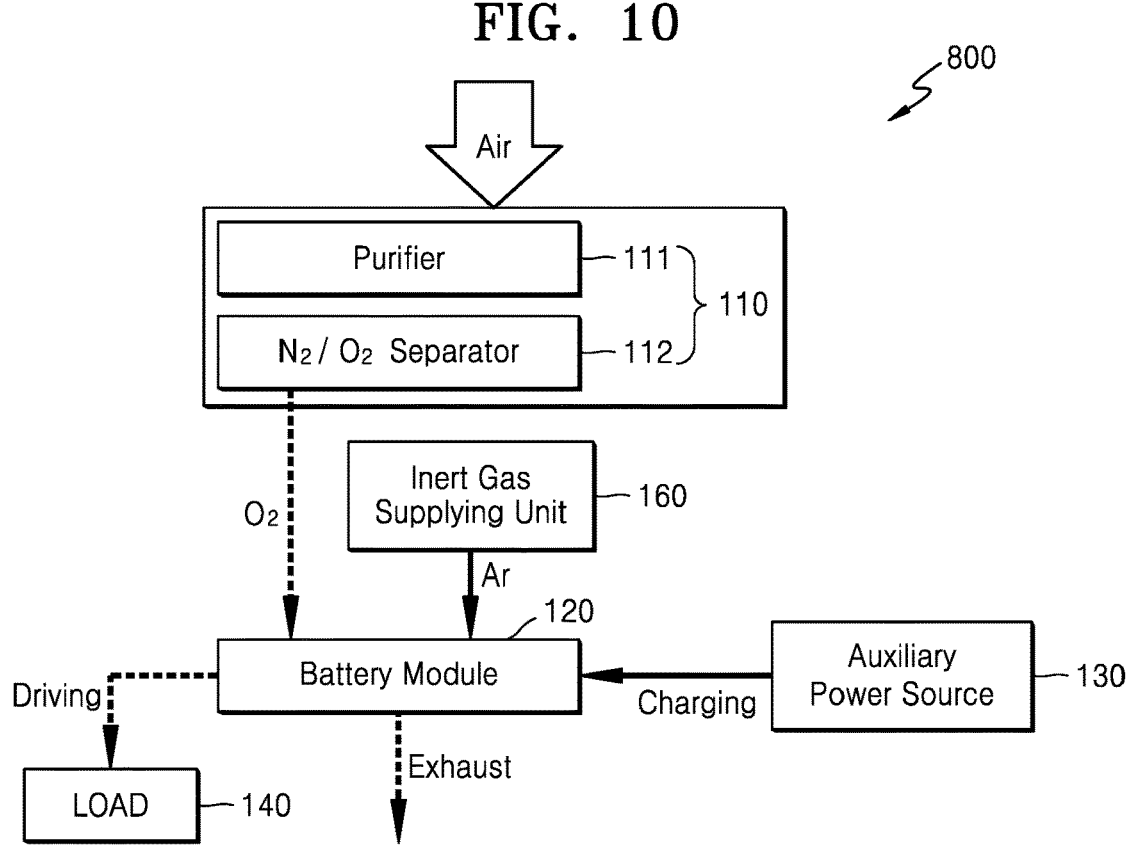
FIG. 10 is a block diagram schematically illustrating a metal air battery system according to another exemplary embodiment.

FIG. 10 is a block diagram schematically illustrating a metal air battery system 800 according to another exemplary embodiment.

Referring to FIG. 10, the metal air battery system 800 may include the oxygen supplying unit 110, an inert gas supplying unit 160, the metal air battery module 120, and the auxiliary power source 130. The oxygen supplying unit 110 may include the purifier 111 for removing moisture and impurities from externally supplied air, and the separator 112 for separating the air purified by the purifier 111 into nitrogen and oxygen.

As is further described below, during the operational stop of the metal air battery module 120, as the inert gas supplying unit 160 supplies inert gas to the metal air battery module 120, at least some of the oxygen remaining in the metal air battery module 120 is removed. The inert gas may include, for example, argon (Ar), helium (He), or nitrogen (N2), but not limited thereto. Alternatively, the inert gas supplying unit 160 may supply the inert gas to the inside of the metal air battery module 120 by supplementing the metal air battery module 120 with an electrolyte containing the inert gas. The inert gas may be contained in the electrolyte, for example, in a gaseous state or an aerosol state.

The metal air battery module 120 may include a plurality of cells (not shown). Each of the cells performs a discharge reaction using the oxygen supplied by the oxygen supplying unit 110. Each of the cells may include a cathode, an anode, and an electrolyte. The cathode uses oxygen as an active material, where an oxidation-reduction reaction of oxygen occurs. An oxidation-reduction reaction of metal occurs at the anode. The electrolyte enables conduction of metal ions between the cathode and the anode.

When the operation of the metal air battery module 120 is stopped, the auxiliary power source 130 may charge the metal air battery module 120. The auxiliary power source 130 may include at least one electrical energy generation and/or storage apparatus.

In the following description, a method of operating the metal air battery system 800 of FIG. 10 is further described.

First, when the metal air battery module 120 is operated to perform a discharge reaction, a method of operating the metal air battery system 800 is further described. When external air is supplied to the inside of the oxygen supplying unit 110, the purifier 111 of the oxygen supplying unit 110 removes moisture and impurities from the supplied air and discharges purified air. The separator 112 separates the air purified by the purifier 111 into nitrogen and oxygen. The oxygen separated and discharged by the oxygen supplying unit 110 is supplied to the metal air battery module 120.

The metal air battery module 120 performs a discharge reaction using the oxygen supplied by the oxygen supplying unit 110. When the discharge reaction is performed, the discharged product, such as $Li_2O_2$ or LiOH, may be generated in the metal air battery module 120.

Next, a method of operating the metal air battery system 800 during the operational stop of the metal air battery module 120 is further described.

When the operation of the metal air battery module 120 is stopped, the operation of the oxygen supplying unit 110 is also stopped and thus the oxygen supplying unit 110 no longer supplies oxygen to the metal air battery module 120. As such, in the state in which the operation of the metal air battery module 120 is stopped, the auxiliary power source 130 charges the metal air battery module 120. Accordingly, at least some of the discharge product remaining in the metal air battery module 120 may be removed. To remove the discharge product, the auxiliary power source 130 may fully charge the metal air battery module 120.

In the state in which the operation of the metal air battery module 120 is stopped, the inert gas supplying unit 160 supplies inert gas to the inside of the metal air battery module 120. Accordingly, the oxygen remaining in the metal air battery module 120 may be exhausted to the outside by purging and removed. As such, as the inert gas supplying unit 160 supplies inert gas to the metal air battery module 120, at least some of the oxygen remaining in the metal air battery module 120 may be removed. Next, the metal air battery module 120 where the discharge product and the oxygen are removed may be maintained by being closed from the outside. Alternatively, in the state in which the operation of the metal air battery module 120 is stopped, the inert gas supplying unit 160 may supply the inert gas to the inside of the metal air battery module 120 by supplementing the metal air battery module 120 with an electrolyte containing the inert gas.

As is further described above, as the auxiliary power source 130 charges the metal air battery module 120, the discharge product remaining in the metal air battery module 120 may be removed. As the inert gas supplying unit 160 supplies inert gas to the metal air battery module 120, the oxygen remaining in the metal air battery module 120 may be removed. Accordingly, during the operational stop of the metal air battery module 120, the deterioration of the elements of the metal air battery module 120 due to the discharge product and the oxygen may be prevented.

Figure 11:
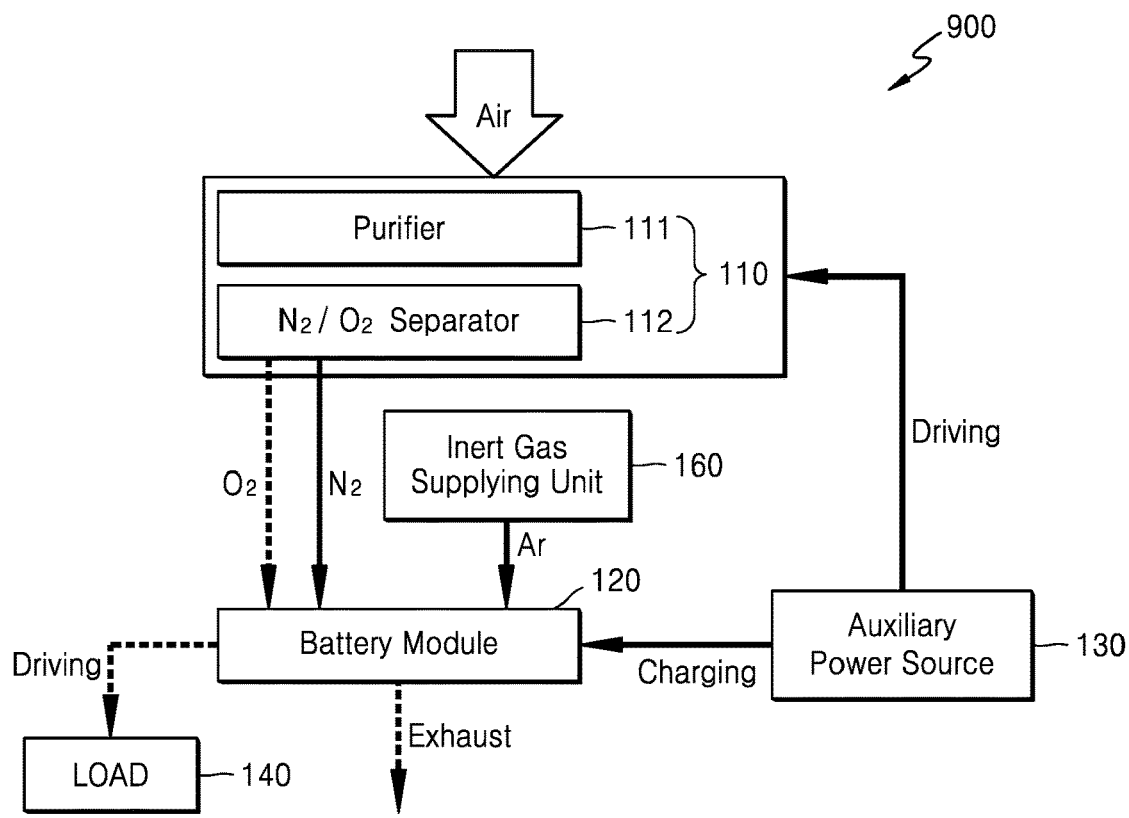
FIG. 11 is a block diagram schematically illustrating a metal air battery system according to another exemplary embodiment.

FIG. 11 is a block diagram schematically illustrating a metal air battery system 900 according to another exemplary embodiment. The metal air battery system 900 of FIG. 11 is the same as the metal air battery system 800 of FIG. 10, except that the auxiliary power source 130 drives the oxygen supplying unit 110 so that the oxygen supplying unit 110 additionally supplies nitrogen to the metal air battery module 120.

Referring to FIG. 11, as the inert gas supplying unit 160 supplies inert gas to the metal air battery module 120 during the operational stop of the metal air battery module 120, at least some of the oxygen remaining in the metal air battery module 120 may be removed. Alternatively, the inert gas supplying unit 160 may supply the inert gas to the inside of the metal air battery module 120 by supplementing the metal air battery module 120 with an electrolyte containing the inert gas.

When the operation of the metal air battery module 120 is stopped, the auxiliary power source 130 may charge the metal air battery module 120. Through the charge operation of the metal air battery module 120, at least some of the discharge product remaining in the metal air battery module 120 may be removed. The auxiliary power source 130 may include at least one electrical energy generation and/or storage apparatus.

When the operation of the metal air battery module 120 is stopped, the auxiliary power source 130 may additionally drive the oxygen supplying unit 110. As the auxiliary power source 130 drives the oxygen supplying unit 110, the nitrogen is separated and discharged by the separator 112. As the discharged nitrogen is supplied to the metal air battery module 120, the oxygen remaining in the metal air battery module 120 may be additionally removed.

In the following description, a method of operating the metal air battery system 900 during the operational stop of the metal air battery module 120 is further described.

When the operation of the metal air battery module 120 is stopped, the operation of the oxygen supplying unit 110 is also stopped and thus the oxygen supplying unit 110 no longer supplies oxygen to the metal air battery module 120. As such, in the state in which the operation of the metal air battery module 120 is stopped, the auxiliary power source 130 charges the metal air battery module 120. Accordingly, at least some of the discharge product remaining in the metal air battery module 120 may be removed.

In the state in which the operation of the metal air battery module 120 is stopped, as the inert gas supplying unit 160 supplies the inert gas to the metal air battery module 120, at least some of the oxygen remaining in the metal air battery module 120 may be removed. Also, as the auxiliary power source 130 drives the oxygen supplying unit 110, the oxygen remaining in the metal air battery module 120 may be additionally removed. In other words, when the auxiliary power source 130 drives the oxygen supplying unit 110, the nitrogen separated and discharged by the separator 112 of the oxygen supplying unit 110 may be supplied to the metal air battery module 120. Accordingly, the oxygen remaining in the metal air battery module 120 may be additionally removed. Next, the metal air battery module 120 where the discharge product and the oxygen are removed may be maintained by being closed from the outside.

As is further described above, as the auxiliary power source 130 charges the metal air battery module 120, the discharge product remaining in the metal air battery module 120 may be removed. As the inert gas discharged by the inert gas supplying unit 160 and the nitrogen discharged by the oxygen supplying unit 110 driven by and the auxiliary power source 130 are supplied to the metal air battery module 120, the oxygen remaining in the metal air battery module 120 may be more effectively removed.

Figure 12:
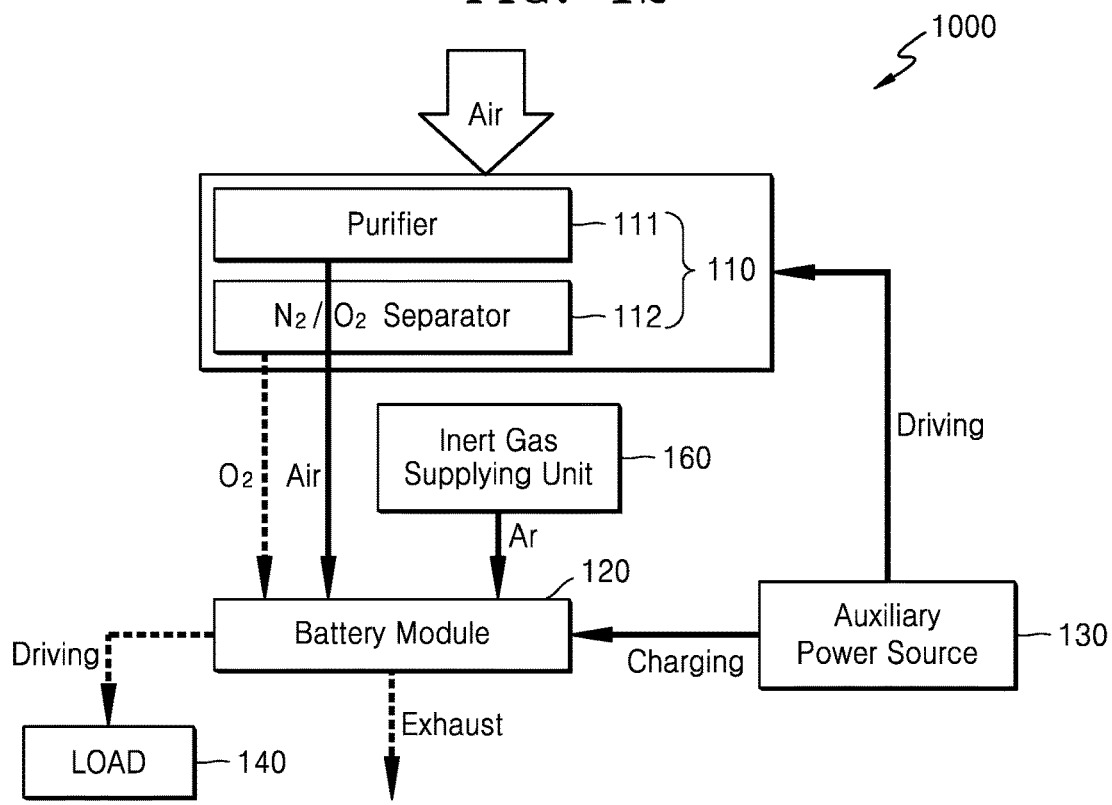
FIG. 12 is a block diagram schematically illustrating a metal air battery system according to another exemplary embodiment.

FIG. 12 is a block diagram schematically illustrating a metal air battery system 1000 according to another exemplary embodiment. The metal air battery system 1000 of FIG. 12 is the same as the metal air battery system 900 of FIG. 11, except that the auxiliary power source 130 drives the oxygen supplying unit 110 so that the oxygen supplying unit 110 supplies purified air to the metal air battery module 120.

Referring to FIG. 12, during the operational stop of the metal air battery module 120, the inert gas supplying unit 160 supplies inert gas to the metal air battery module 120 and thus at least some of the oxygen remaining in the metal air battery module 120 may be removed. Alternatively, the inert gas supplying unit 160 may supply the inert gas to the inside of the metal air battery module 120 by supplementing the metal air battery module 120 with an electrolyte containing the inert gas.

When the operation of the metal air battery module 120 is stopped, the auxiliary power source 130 may charge the metal air battery module 120. In the charge operation of the metal air battery module 120, at least some of the discharge product remaining in the metal air battery module 120 may be removed. The auxiliary power source 130 may include at least one electrical energy generation and/or storage apparatus.

When the operation of the metal air battery module 120 is stopped, the auxiliary power source 130 may additionally drive the oxygen supplying unit 110. The auxiliary power source 130 drives the purifier 111 so that the air purified by the purifier 111 may be discharged. When the discharged air is supplied to the metal air battery module 120, the quantity of the oxygen remaining in the metal air battery module 120 may be additionally removed.

As is further described above, as the auxiliary power source 130 charges the metal air battery module 120, the discharge product remaining in the metal air battery module 120 may be removed. As the inert gas discharged by the inert gas supplying unit 160 and the air discharged by the oxygen supplying unit 110 driven by and the auxiliary power source 130 are supplied to the metal air battery module 120, the oxygen remaining in the metal air battery module 120 may be more effectively removed.

Figure 13:
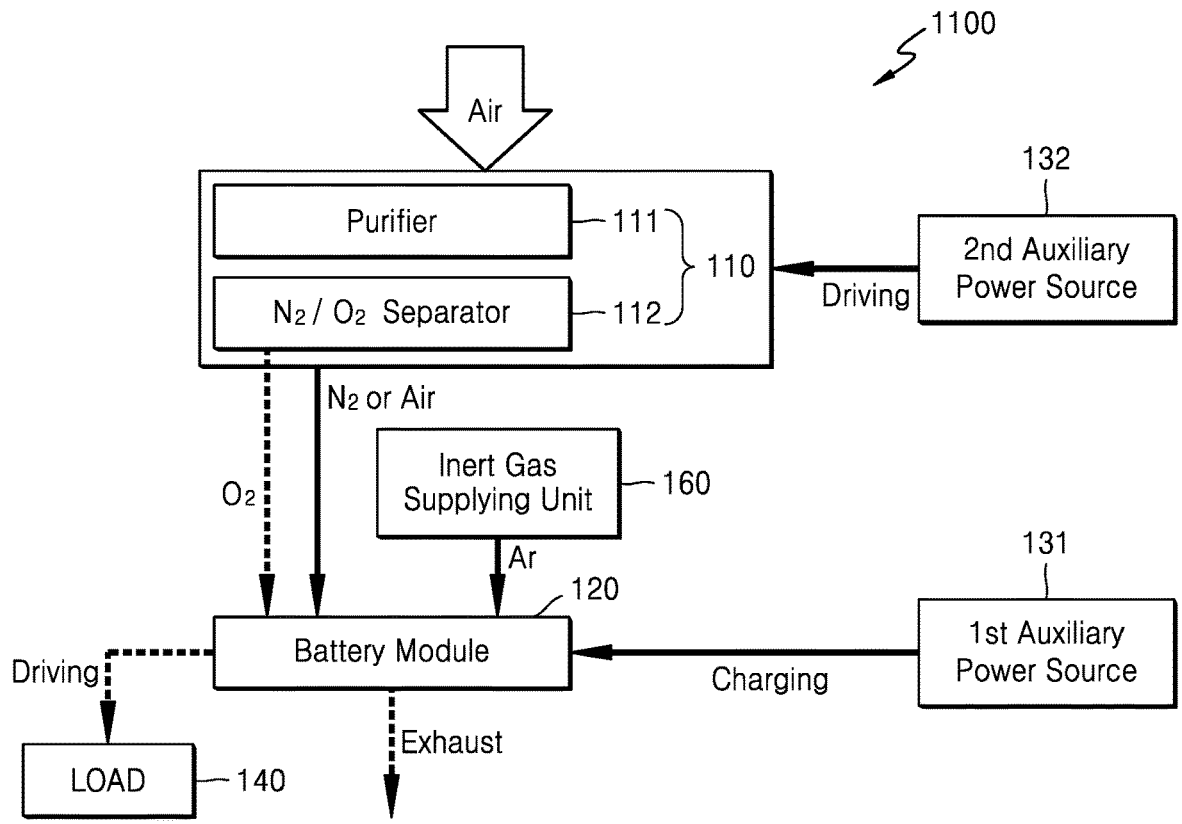
FIG. 13 is a block diagram schematically illustrating a metal air battery system according to another exemplary embodiment.

FIG. 13 is a block diagram schematically illustrating a metal air battery system 1100 according to another exemplary embodiment. The metal air battery system 1100 of FIG. 13 is the same as the metal air battery systems 900 and 1000 of FIGS. 11 and 12, except that the metal air battery system 1100 includes the second auxiliary power source 132 for driving the oxygen supplying unit 110 during the operational stop of the metal air battery module 120.

Referring to FIG. 13, the metal air battery system 1100 may include the oxygen supplying unit 110, the inert gas supplying unit 160, the metal air battery module 120, the first auxiliary power source 131, and the second auxiliary power source 132. The oxygen supplying unit 110 may include the purifier 111 for removing moisture and impurities from externally supplied air, and the separator 112 for separating the air purified by the purifier 111 into nitrogen and oxygen.

During the operational stop of the metal air battery module 120, the inert gas supplying unit 160 may supply inert gas to the metal air battery module 120 and thus at least some of the oxygen remaining in the metal air battery module 120 may be removed. Alternatively, the inert gas supplying unit 160 may supply the inert gas to the inside of the metal air battery module 120 by supplementing the metal air battery module 120 with an electrolyte containing the inert gas.

The metal air battery module 120 may include a plurality of cells (not shown). Each of the cells performs a discharge reaction using the oxygen supplied by the oxygen supplying unit 110.

During the operational stop of the metal air battery module 120, the first auxiliary power source 131 may charge the metal air battery module 120. The first auxiliary power source 131 may include at least one electrical energy generation and/or storage apparatus. For example, the first auxiliary power source 131 may include a primary battery, a secondary battery, a solar battery, or a capacitor. However, this is merely exemplary and the first auxiliary power source 131 may include any suitable type of an electrical energy generation and/or storage apparatus.

When the operation of the metal air battery module 120 is stopped, the second auxiliary power source 132 may drive the oxygen supplying unit 110. Like the first auxiliary power source 131, the second auxiliary power source 132 may include at least one electrical energy generation and/or storage apparatus. When the second auxiliary power source 132 drives the oxygen supplying unit 110, the oxygen supplying unit 110 may discharge nitrogen or air. As the discharged nitrogen or air is supplied to the metal air battery module 120, the oxygen in the metal air battery module 120 may be removed.

In the following description, a method of operating the metal air battery system 1100 of FIG. 13 is further described.

First, a method of operating the metal air battery system 1100 when the metal air battery module 120 performs a discharge reaction is further described. When external air is supplied to the inside of the oxygen supplying unit 110, the purifier 111 of the oxygen supplying unit 110 removes moisture and impurities from the supplied air and discharges purified air. The separator 112 separates the air purified by the purifier 111 into nitrogen and oxygen. The oxygen separated and discharged by the oxygen supplying unit 110 is supplied to the metal air battery module 120.

The metal air battery module 120 performs a discharge reaction using the oxygen supplied by the oxygen supplying unit 110. When the discharge reaction is performed, the discharged product, such as $Li_2O_2$ or $LiOH$, may be generated in the metal air battery module 120.

Next, a method of operating the metal air battery system 1100 during the operational stop of the metal air battery module 120 is further described.

When the operation of the metal air battery module 120 is stopped, the operation of the oxygen supplying unit 110 is also stopped and thus the oxygen supplying unit 110 no longer supplies the oxygen to the metal air battery module 120. As such, in the state in which the operation of the metal air battery module 120 is stopped, the first auxiliary power source 131 charges the metal air battery module 120. Accordingly, at least some of the discharge product remaining in the metal air battery module 120 may be removed. To remove the discharge product, the first auxiliary power source 131 may fully charge the metal air battery module 120.

In the state in which the operation of the metal air battery module 120 is stopped, the inert gas supplying unit 160 supplies inert gas to the inside of the metal air battery module 120. Accordingly, at least some of the oxygen remaining in the metal air battery module 120 may be exhausted to the outside and removed.

Also, in the state in which the operation of the metal air battery module 120 is stopped, as the second auxiliary power source 132 drives the oxygen supplying unit 110, the oxygen in the metal air battery module 120 may be additionally removed. As the nitrogen discharged by the separator 112 of the oxygen supplying unit 110 is supplied to the metal air battery module 120 or the purified air discharged by the purifier 111 of the oxygen supplying unit 110 is supplied to the metal air battery module 120, the oxygen in the metal air battery module 120 may be additionally removed. Next, the metal air battery module 120 where the discharge product and the oxygen are removed may be kept by being closed from the outside.

As is further described above, as the first auxiliary power source 131 charges the metal air battery module 120, the discharge product remaining in the metal air battery module 120 may be removed. As the inert gas discharged by the inert gas supplying unit 160 and the nitrogen or air discharged by the oxygen supplying unit 110 driven by the second auxiliary power source 132 is supplied to the metal air battery module 120, the oxygen remaining in the metal air battery module 120 may be more effectively removed.

Figure 14:
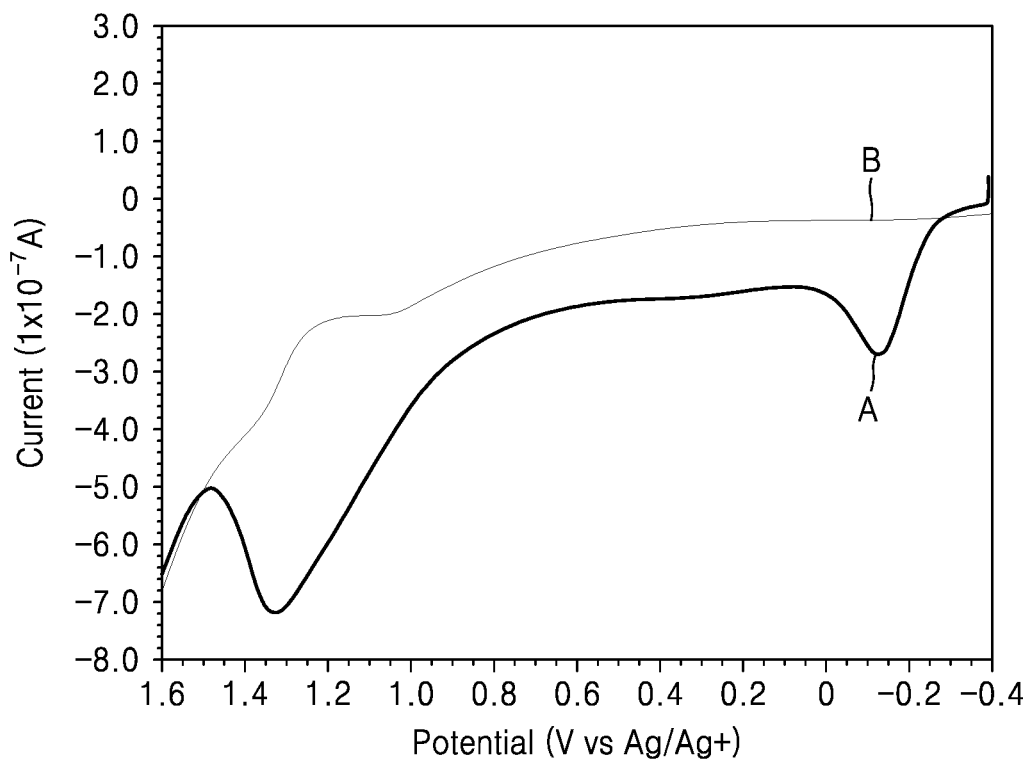
FIG. 14 is a graph of current ($1\times10^{-7}$ amperes (A)) versus potential (Volts (V) versus $Ag/Ag^+$) showing a result of analysis of electrochemical stability of an electrolyte including $Li_2O_2$ and an electrolyte where $Li_2O_2$ is removed after two hours pass using a linear sweep voltammetry (LSV).

FIG. 14 is a graph showing a result of measurement of electrochemical stability of an electrolyte including $Li_2O_2$ and an electrolyte where $Li_2O_2$ is removed after two hours pass using a linear sweep voltammetry (LSV).

In FIG. 14, a curve A indicates electrochemical stability of an electrolyte including $Li_2O_2$, and a curve B indicates electrochemical stability of an electrolyte where $Li_2O_2$ is removed. Referring to FIG. 14, since no side reaction occurs in the electrolyte that does not include $Li_2O_2$, the electrolyte having no $Li_2O_2$ shows a higher stability than the electrolyte including $Li_2O_2$. It may be seen from the above result that removing $Li_2O_2$, which is a discharge product, from an electrolyte may improve stability of the metal air battery module 120.

As is further described above, according to the above-described exemplary embodiments, as the auxiliary power source charges the metal air battery module, the discharge product remaining in the metal air battery module is removed. Also, as the oxygen remaining in the metal air battery module is removed by purging, the deterioration of the elements of the metal air battery module during the operational stop of the metal air battery module may be prevented.

It should be understood that exemplary embodiments described herein should be considered in a descriptive sense only and not for purposes of limitation. Descriptions of features or aspects within each exemplary embodiment should be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A metal air battery system comprising:
an oxygen supplying unit configured to discharge oxygen, wherein the oxygen supplying unit comprises a separator configured to separate oxygen and nitrogen from externally supplied air;
a metal air battery module connected to the oxygen supplying unit and configured to receive the oxygen from the oxygen supplying unit and perform a discharge reaction which creates a discharge product; and
an auxiliary power source electrically connected to the metal air battery module and configured to charge the metal air battery module so that at least some of the discharge product is discharged from the metal air battery module when the discharge reaction of the metal air battery module is stopped,
wherein the oxygen supplying unit is further configured to discharge the nitrogen separated from the externally supplied air to an inside of the metal air battery module so as to remove at least some oxygen from the metal air battery module when the discharge reaction of the metal air battery module is stopped,
wherein the auxiliary power source is electrically connected to the oxygen supplying unit and is configured to drive the oxygen supplying unit to supply nitrogen separated and discharged by the separator of the oxygen supplying unit to the inside of the metal air battery module so as to remove at least some oxygen from the metal air battery module when the discharge reaction of the metal air battery module is stopped.

2. The metal air battery system of claim 1, wherein the oxygen supplying unit further comprises
a purifier configured to provide purified externally supplied air.

3. The metal air battery system of claim 2, wherein the auxiliary power source is further configured to drive the oxygen supplying unit during the operational stop of the metal air battery module to supply air purified by the purifier of the oxygen supplying unit to an inside of the metal air battery module so as to remove at least oxygen from the metal air battery module.

4. The metal air battery system of claim 1, further comprising another auxiliary power source configured to drive the oxygen supplying unit during the operational stop of the metal air battery module.

5. The metal air battery system of claim 2, further comprising a nitrogen reservoir configured to store nitrogen separated and discharged by the oxygen supplying unit and supply nitrogen to an inside of the metal air battery module during the operational stop of the metal air battery module so as to remove at least some of the oxygen from the metal air battery module.

6. The metal air battery system of claim 5, wherein the auxiliary power source is further configured to drive the oxygen supplying unit during the operational stop of the metal air battery module to supply nitrogen separated and discharged by the separator of the oxygen supplying unit inside the metal air battery module so as to additionally remove oxygen from the metal air battery module.

7. The metal air battery system of claim 5, wherein the auxiliary power source is further configured to drive the oxygen supplying unit during the operational stop of the metal air battery module to supply air purified by the purifier of the oxygen supplying unit to the inside of the metal air battery module so as to additionally remove oxygen from the metal air battery module.

8. The metal air battery system of claim 2, further comprising an inert gas supplying unit configured to supply inert gas to an inside of the metal air battery module during an operational stop of the metal air battery module so as to remove at least some of oxygen from the metal air battery module.

9. The metal air battery system of claim 8, wherein the inert gas comprises argon, helium, nitrogen, or a combination thereof.

10. The metal air battery system of claim 8, wherein the inert gas supplying unit is further configured to supply an electrolyte containing the inert gas to the inside of the metal air battery module.

11. The metal air battery system of claim 8, wherein the auxiliary power source is further configured to drive the oxygen supplying unit during the operational stop of the metal air battery module to supply nitrogen separated and discharged by the separator of the oxygen supplying unit to the inside of the metal air battery module so as to additionally remove oxygen from the metal air battery module.

12. The metal air battery system of claim 8, wherein the auxiliary power source is further configured to drive the oxygen supplying unit during the operational stop of the metal air battery module to supply air purified by the purifier of the oxygen supplying unit to the inside of the metal air battery module so as to additionally remove oxygen in the metal air battery module.

13. The metal air battery system of claim 1, wherein the discharge product comprises $Li_2O_2$, $LiOH$, $Li_2CO_3$, or a combination thereof.

14. The metal air battery system of claim 1, wherein the discharge product comprises $Li_2O_2$.

15. The metal air battery system of claim 1, wherein the metal air battery module comprises at least one battery cell, and the at least one battery cell comprises a cathode, an anode, and an electrolyte.

16. The metal air battery system of claim 1, wherein the auxiliary power source comprises at least one electrical energy generation and/or storage apparatus.

17. A method of operating the metal air battery system of claim 1, the method comprising:
stopping the discharge reaction of the metal air battery module;
charging the metal air battery module from the auxiliary power source to thereby remove at least some of the discharge product from the metal air battery module; and
removing at least some of oxygen from the metal air battery module.

18. The method of claim 17, wherein the removing of the oxygen from the metal air battery module comprises removing the at least some of the oxygen from the metal air battery module by supplying nitrogen separated and discharged by a separator of the oxygen supplying unit to an inside of the metal air battery module while the auxiliary power source drives the oxygen supplying unit.

19. The method of claim 17, wherein the removing of the at least some of oxygen from the metal air battery module comprises removing the at least some of the oxygen from the metal air battery module by supplying air purified by a purifier of the oxygen supplying unit to an inside of the metal air battery module while the auxiliary power source drives the oxygen supplying unit.

20. The method of claim 17, wherein the removing of the at least some of oxygen from the metal air battery module comprises removing the at least some oxygen from the metal air battery module while another auxiliary power source drives the oxygen supplying unit.

21. The method of claim 17, further comprising storing, in a nitrogen reservoir, nitrogen separated and discharged by the oxygen supplying unit during an operation of the metal air battery module.

22. The method of claim 21, wherein the removing of the at least some oxygen from the metal air battery module comprises removing the at least some oxygen from the metal air battery module by supplying nitrogen stored in the nitrogen reservoir.

23. The method of claim 22, further comprising additionally removing the at least some of oxygen from the metal air battery module by supplying nitrogen separated and discharged by a separator of the oxygen supplying unit to the inside of the metal air battery module while the auxiliary power source drives the oxygen supplying unit.

24. The method of claim 22, further comprising additionally removing the at least some of oxygen from the metal air battery module by supplying air purified by a purifier of the oxygen supplying unit to the inside of the metal air battery module while the auxiliary power source drives the oxygen supplying unit.

25. The method of claim 17, wherein the removing of the at least some of oxygen from the metal air battery module comprises removing the at least some oxygen from the metal air battery module by supplying inert gas to an inside of the metal air battery module via an inert gas supplying unit.

26. The method of claim 25, wherein the inert gas comprises argon, helium, nitrogen, or a combination thereof.

27. The method of claim 25, wherein the inert gas supplying unit supplies an electrolyte containing the inert gas to the inside of the metal air battery module.

28. The method of claim 25, further comprising additionally removing the at least some of oxygen from the metal air battery module by supplying nitrogen separated and discharged by a separator of the oxygen supplying unit to the inside of the metal air battery module while the auxiliary power source drives the oxygen supplying unit.

29. The method of claim 25, further comprising additionally removing the at least some of oxygen from the metal air battery module by supplying air purified by a purifier of the oxygen supplying unit to the inside of the metal air battery module while the auxiliary power source drives the oxygen supplying unit.

30. The method of claim 17, further comprising closing and storing the metal air battery module after removing the discharge product and oxygen.

31. The method of claim 17, wherein the discharge product comprises $Li_2O_2$, $LiOH$, $Li_2CO_3$, or a combination thereof.

32. The method of claim 17, wherein the auxiliary power source comprises at least one electrical energy generation and/or storage apparatus.

* * * * *